United States Patent
Goto et al.

(10) Patent No.: US 8,101,537 B2
(45) Date of Patent: Jan. 24, 2012

(54) PREPOLYMERIZED CATALYST FOR OLEFIN POLYMERIZATION, METHOD OF PRODUCING THIS PREPOLYMERIZED CATALYST AND METHOD OF PRODUCING OLEFIN POLYMER

(75) Inventors: Tomoaki Goto, Kisarazu (JP); Yoshimitsu Onodera, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 39 days.

(21) Appl. No.: 12/712,992

(22) Filed: Feb. 25, 2010

(65) Prior Publication Data
US 2010/0280196 A1   Nov. 4, 2010

(30) Foreign Application Priority Data

| Feb. 27, 2009 | (JP) | 2009-046862 |
| Feb. 27, 2009 | (JP) | 2009-046863 |
| Dec. 22, 2009 | (JP) | 2009-291339 |
| Dec. 22, 2009 | (JP) | 2009-291340 |

(51) Int. Cl.
*C08F 4/42* (2006.01)
*C08F 4/6592* (2006.01)
*B01J 31/22* (2006.01)

(52) U.S. Cl. ........ 502/105; 502/103; 502/104; 502/108; 502/109; 502/152; 526/129; 526/160; 526/943

(58) Field of Classification Search .............. 502/103, 502/104, 105, 108, 109, 152; 526/129, 160, 526/943
See application file for complete search history.

(56) References Cited

U.S. PATENT DOCUMENTS

| 7,022,782 B2 * | 4/2006 | Ogane .................... 526/160 |
| 2011/0137003 A1 * | 6/2011 | Collins et al. ............. 526/351 |

FOREIGN PATENT DOCUMENTS

JP   2003-105013 A   4/2003

* cited by examiner

*Primary Examiner* — Caixia Lu
(74) *Attorney, Agent, or Firm* — Sughrue Mion, PLLC

(57) ABSTRACT

A method of producing a prepolymerized catalyst for olefin polymerization comprising a fine powder removal step of removing fine particles from olefin-prepolymerized catalyst particles for olefin polymerization. The prepolymerized catalyst having a low fine particle content is applicable suitably to the field of continuous polymerization of olefins.

5 Claims, 1 Drawing Sheet

PREPOLYMERIZED CATALYST FOR OLEFIN POLYMERIZATION, METHOD OF PRODUCING THIS PREPOLYMERIZED CATALYST AND METHOD OF PRODUCING OLEFIN POLYMER

BACKGROUND OF THE INVENTION

1. Field of the Invention

The present invention relates to a prepolymerized catalyst for olefin polymerization, a method of producing the prepolymerized catalyst, and a method of producing an olefin polymer using the same.

2. Description of the Related Art

Conventionally, it is known to produce an olefin polymer in the form of particles using a particulate solid catalyst in, what is called, olefin gas phase polymerization or slurry polymerization in which an olefin is polymerized in a gas phase or slurry state to produce an olefin polymer.

A particulate solid catalyst applied to gas phase polymerization or slurry polymerization is required to provide an olefin polymer excellent in particle property and state, and for example, patent document 1 describes a uniform solid catalyst component or uniform solid catalyst from which fine powder components and/or irregular form components have been removed, and it is described that an olefin may be prepolymerized to the above-described uniform solid catalyst component or uniform solid catalyst to give prepolymerized catalysts.

(Patent document 1) JP-A No. 2003-105013 (published on Apr. 9, 2003)

However, also in olefin gas phase or slurry polymerization using the prepolymerized catalyst as described above, it is required to prevent fouling of olefin polymer particles to interior portions of a polymerization reactor, for example, to enlarged parts of a polymerization reactor, and a prepolymerized catalyst for olefin polymerization which is capable of preventing fouling of olefin polymer particles to a polymerization reactor has been required.

SUMMARY OF THE INVENTION

An object of the present invention is to provide a prepolymerized catalyst for olefin polymerization which is capable of preventing fouling of olefin polymer particles to a polymerization reactor, a method of producing the prepolymerized catalyst, and a method of producing an olefin polymer using the same.

The method of producing a prepolymerized catalyst for olefin polymerization according to the present invention Comprises a fine powder removal step of removing fine particles from olefin-prepolymerized catalyst particles.

In the method of producing an olefin polymer according to the present invention, polymerization of an olefin is performed using a prepolymerized catalyst for olefin polymerization produced by the above-described production method.

By the production method of the present invention, a prepolymerized catalyst which is capable of preventing fouling of olefin polymer particles to a polymerization reactor is obtained, and if an olefin is polymerized using this catalyst, fouling of olefin polymer particles to a polymerization reactor can be prevented.

Figure 1:
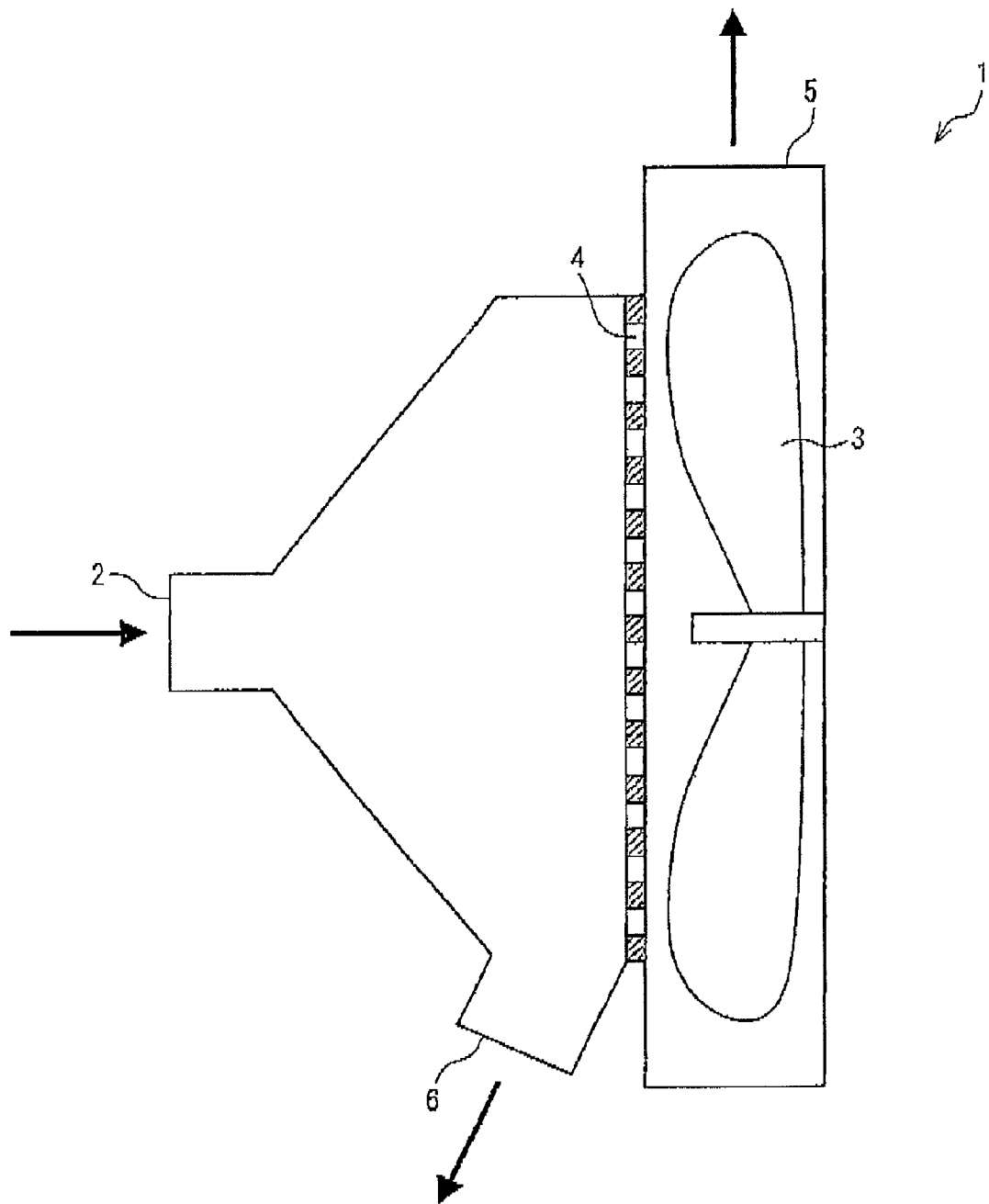
FIG. 1 is an illustration view for explaining one embodiment of the method of producing a prepolymerized catalyst for olefin polymerization according to the present invention.

EXPLANATION OF MARKS 1 classification apparatus
2 suction port
3 fan
4 fractionating screen
5 discharge port
6 takeoff port

DETAILED DESCRIPTION OF THE INVENTION

Embodiments of the present invention will be described in detail below.

(Method of Producing Prepolymerized Catalyst for Olefin Polymerization)

The method of producing a prepolymerized catalyst for olefin polymerization according to the present invention comprises a fine powder removal step of removing fine particles from olefin-prepolymerized catalyst particles.

(Prepolymerized Catalyst for Olefin Polymerization)

In the present invention, the prepolymerized catalyst particles for olefin polymerization mean particles and/or powders constituting a prepolymerized catalyst, and the prepolymerized catalyst has a constitution containing the prepolymerized catalyst particles. The fine particles are prepolymerized catalyst particles having small particle size (fine powder) having a possibility of causing problems such as agglomeration of the prepolymerized catalyst, cyclone blockage and the like in the olefin polymerization described above.

In the present invention, prepolymerization means polymerization of a small amount of olefin on a catalyst component prepared for olefin polymerization, thereby forming an olefin polymer on the catalyst component. In the present invention, the prepolymerized catalyst means a catalyst obtained by prepolymerization of an olefin on a catalyst component for olefin polymerization, and referred to simply as a prepolymerized catalyst in some cases. In the present invention, the prepolymerized catalyst particles mean particles and/or powders constituting a prepolymerized catalyst, and the prepolymerized catalyst has a constitution containing the prepolymerized catalyst particles.

The particle size of the fine particles can be not larger than $R^1$ represented by the following formula (1):

$$R^1 = \text{(average particle size of prepolymerized catalyst particles)} \times 0.65 \qquad (1)$$

In the prepolymerized catalyst for olefin polymerization according to the present invention, the content of particles having a particle size of not larger than $R^2$ represented by the formula (2) is preferably 5% by weight or less:

$$R^2 = \text{(average particle size of the above-described prepolymerized catalyst)} \times 0.63 \qquad (2)$$

The present inventors have found that when the content of particles having a particle size of not larger than $R^2$ described above is high in a prepolymerized catalyst, there is a tendency of occurrence of problems such as agglomeration of the prepolymerized catalyst, cyclone blockage and the like in the olefin polymerization described above. Since the content of such fine particles is as slight as 5% by weight or less, the prepolymerized catalyst according to the present invention is capable of preventing generation of the problems in the olefin polymerization described above.

Here, the average particle size of a prepolymerized catalyst is determined depending on the size of a catalyst component and the prepolymerization amount of an olefin, and preferably 80 μm or more and 300 μm or less. The average particle size of a prepolymerized catalyst can be measured by known particle size distribution measuring methods.

As the catalyst component for olefin polymerization to be used in the present invention, known polymerization catalyst components used in olefin polymerization can be used, and examples thereof include metallocene catalysts, Ziegler type catalysts, Phillips type catalysts and the like, preferably metallocene catalysts. As the metallocene catalyst, there are mentioned, for example, those formed by contacting a co-catalyst component, a metallocene compound and an organoaluminum compound.

The catalyst component for olefin polymerization to be used in the present invention is preferably one formed by contacting a co-catalyst component (hereinafter, described as "component (B)" in some cases), a metallocene compound (hereinafter, described as "component (A)" in some cases) and an organoaluminum compound (hereinafter, described as "component (C)" in some cases). Thought it is known that prepolymerized catalyst particles obtained by prepolymerization of an olefin to such a catalyst component for olefin polymerization tend to contain fine particles, the prepolymerized catalyst according to the present invention is particularly suitable for production of an olefin polymer since the content of such fine particles is suppressed to low.

Examples of the co-catalyst component to be used in the present invention include solid catalyst components formed by contacting the following component (b1), the following component (b2), the following component (b3) and the following component (b4), solid catalyst components formed by contacting an organoaluminum oxy compound and a particulate carrier, solid catalyst components formed by contacting a boron compound and a particulate carrier; and the like.

(b1): a compound of the following formula (5)

$$M^3L_x \quad (5)$$

[wherein, M3 represents a lithium atom, sodium atom, potassium atom, rubidium atom, cesium atom, beryllium atom, magnesium atom, calcium atom, strontium atom, barium atom, zinc atom, germanium atom, tin atom, lead atom, antimony atom or bismuth atom, and x represents a number corresponding to the atomic valence of $M^3$. L represents a hydrogen atom, halogen atom or optionally-substituted hydrocarbyl group, and when there exists a plurality of L, these may be mutually the same or different.]

(b2): a compound of the following formula (6)

$$R^6_{t-1}T^1H \quad (6)$$

[wherein, $T^1$ represents an oxygen atom, sulfur atom, nitrogen atom or phosphorus atom, and t represents a number corresponding to the atomic valence of $T^1$. $R^6$ represents a halogen atom, electron attractive group, group containing a halogen atom or group having an electron attractive group, and when there exists a plurality of $R^6$, these may be mutually the same or different.]

(b3): a compound of the following formula (7)

$$R^7_{s-2}T^2H_2 \quad (7)$$

[wherein, $T^2$ represents an oxygen atom, sulfur atom, nitrogen atom or phosphorus atom, and s represents a number corresponding to the atomic valence of $T^2$. $R^7$ represents a halogen atom, hydrocarbyl group or halogenated hydrocarbyl group.]

(b4): a particulate carrier.

$M^3$ in the formula (5) represents a lithium atom, sodium atom, potassium atom, rubidium atom, cesium atom, beryllium atom, magnesium atom, calcium atom, strontium atom, barium atom, zinc atom, germanium atom, tin atom, lead atom, antimony atom or bismuth atom. It represents preferably a magnesium atom, calcium atom, strontium atom, barium atom, zinc atom, germanium atom, tin atom or bismuth atom, more preferably a magnesium atom, zinc atom, tin atom or bismuth atom, and further preferably a zinc atom.

x in the formula (5) represents a number corresponding to the atomic valence of $M^3$. For example, when $M^3$ represents a zinc atom, x represents 2.

L in the formula (5) represents a hydrogen atom, halogen atom or optionally-substituted hydrocarbyl group, when there exists a plurality of L, these may be mutually the same or different.

The halogen atom represented by L includes a fluorine atom, chlorine atom, bromine atom, iodine atom and the like.

The optionally-substituted hydrocarbyl group represented by L includes an alkyl group, aralkyl group, aryl group, halogenated alkyl group and the like.

As the alkyl group represented by L, alkyl groups having 1 to 20 carbon atoms are preferable, and examples thereof include a methyl group, ethyl group, n-propyl group, isopropyl group, n-butyl group, isobutyl group, sec-butyl group, tert-butyl group, n-pentyl group, neopentyl group, isopentyl group, n-hexyl group, n-heptyl group, n-octyl group, n-decyl group, n-nonyl group, n-decyl group, n-dodecyl group, n-tridecyl group, n-tetradecyl group, n-pentadecyl group, n-hexadecyl group, n-heptadecyl group, n-octadecyl group, n-nonadecyl group, n-eicosyl group and the like. Preferable is a methyl group, ethyl group, isopropyl group, text-butyl group or isobutyl group.

As the halogenated alkyl group represented by L, halogenated alkyl groups having 1 to 20 carbon atoms are preferable, and examples thereof include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group and the like.

As the aralkyl group represented by L, aralkyl groups having 7 to 20 carbon atoms are preferable, and examples thereof include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-decylphenyl)methyl group, (n-tetradecylphenyl)methyl group, naphthylmethyl group, anthracenylmethyl group, phenylethyl group, phenylpropyl group, phenylbutyl group, diphenylmethyl group, diphenylethyl group, diphenylpropyl group, diphenylbutyl group and the like. Preferable is a benzyl group. Further mentioned are halogenated aralkyl groups having 7 to 20 carbon atoms obtained by substitution of these aralkyl groups by a halogen atom such as a fluorine atom, chlorine atom, bromine atom or iodine atom and the like.

As the aryl group represented by L, aryl groups having 6 to 20 carbon atoms are preferable, and examples thereof include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, diethylphenyl group, triethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group and the like. Preferable is a phenyl group. Further mentioned are halogenated aryl groups having 6 to 20 carbon atoms obtained by substitution of these aryl groups by a halogen atom such as a fluorine atom, chlorine atom, bromine atom or iodine atom and the like.

L represents preferably a hydrogen atom, alkyl group or aryl group, more preferably a hydrogen atom or alkyl group, and further preferably an alkyl group.

$T^1$ in the formula (6) represents an oxygen atom, sulfur atom, nitrogen atom or phosphorus atom, preferably a nitrogen atom or oxygen atom, and more preferably an oxygen atom.

t in the formula (6) represent the atomic valence of $T^1$, and when $T^1$ represents an oxygen atom or sulfur atom, t represents 2, and when $T^1$ represents a nitrogen atom or phosphorus atom, t represents 3.

$R^6$ in the formula represents a halogen atom, an electron attractive group, a group containing a halogen atom or a group having an electron attractive group, and when there exists a plurality of $R^6$, these may be mutually the same or different. As the index of electron attractivity, the Hammett rule substituent constant σ and the like are known, and functional groups in which the Hammett rule substituent constant σ is positive are mentioned as the electron attractive group.

The halogen atom represented by $R^6$ includes a fluorine atom, chlorine atom, bromine atom, iodine atom and the like.

The electron attractive group represented by $R^6$ includes a cyano group, nitro group, carbonyl group, hydrocarbyloxycarbonyl group, sulfone group, phenyl group and the like.

The group containing a halogen atom represented by $R^6$ includes halogenated hydrocarbyl groups such as a halogenated alkyl group, halogenated aralkyl group, halogenated aryl group, (halogenated alkyl)aryl group and the like; halogenated hydrocarbyloxy groups; halogenated hydrocarbyloxycarbonyl groups, and the like. The group having an electron attractive group represented by $R^6$ includes cyanated hydrocarbyl groups such as a cyanated aryl group and the like, nitrated hydrocarbyl groups such as a nitrated aryl group and the like, etc.

The halogenated alkyl group represented by $R^6$ includes a fluoromethyl group, chloromethyl group, bromomethyl group, iodomethyl group, difluoromethyl group, dichloromethyl group, dibromomethyl group, diiodomethyl group, trifluoromethyl group, trichloromethyl group, tribromomethyl group, triiodomethyl group, 2,2,2-trifluoroethyl group, 2,2,2-trichloroethyl group, 2,2,2-tribromoethyl group, 2,2,2-triiodoethyl group, 2,2,3,3,3-pentafluoropropyl group, 2,2,3,3,3-pentachloropropyl group, 2,2,3,3,3-pentabromopropyl group, 2,2,3,3,3-pentaiodopropyl group, 2,2,2-trifluoro-1-trifluoromethylethyl group, 2,2,2-trichloro-1-trichloromethylethyl group, 2,2,2-tribromo-1-tribromomethylethyl group, 2,2,2-triiodo-1-triiodomethylethyl group, 1,1-bis(trifluoromethyl)-2,2,2-trifluoroethyl group, 1,1-bis(trichloromethyl)-2,2,2-trichloroethyl group, 1,1-bis(tribromomethyl)-2,2,2-tribromoethyl group, 1,1-bis(triiodomethyl)-2,2,2-triiodoethyl group and the like.

The halogenated aryl group represented by $R^6$ includes a 2-fluorophenyl group, 3-fluorophenyl group, 4-fluorophenyl group, 2,4-difluorophenyl group, 2,6-difluorophenyl group, 3,4-difluorophenyl group, 3,5-difluorophenyl group, 2,4,6-trifluorophenyl group, 3,4,5-trifluorophenyl group, 2,3,5,6-tetrafluorophenyl group, pentafluorophenyl group, 2,3,5,6-tetrafluoro-4-trifluoromethylphenyl group, 2,3,5,6-tetrafluoro-4-pentafluorophenylphenyl group, perfluoro-1-naphthyl group, perfluoro-2-naphthyl group, 2-chlorophenyl group, 3-chlorophenyl group, 4-chlorophenyl group, 2,4-dichlorophenyl group, 2,6-dichlorophenyl group, 3,4-dichlorophenyl group, 3,5-dichlorophenyl group, 2,4,6-trichlorophenyl group, 3,4,5-trichlorophenyl group, 2,3,5,6-tetrachlorophenyl group, pentachlorophenyl group, 2,3,5,6-tetrachloro-4-trichloromethylphenyl group, 2,3,5,6-tetrachloro-4-pentachlorophenylphenyl group, perchloro-1-naphthyl group, perchloro-2-naphthyl group, 2-bromophenyl group, 3-bromophenyl group, 4-bromophenyl group, 2,4-dibromophenyl group, 2,6-dibromophenyl group, 3,4-dibromophenyl group, 3,5-dibromophenyl group, 2,4,6-tribromophenyl group, 3,4,5-tribromophenyl group, 2,3,5,6-tetrabromophenyl group, pentabromophenyl group, 2,3,5,6-tetrabromo-4-tribromomethylphenyl group, 2,3,5,6-tetrabromo-4-pentabromophenylphenyl group, perbromo-1-naphthyl group, perbromo-2-naphthyl group, 2-iodophenyl group, 3-iodophenyl group, 4-iodophenyl group, 2,4-diiodophenyl group, 2,6-diiodophenyl group, 3,4-diiodophenyl group, 3,5-diiodophenyl group, 2,4,6-triiodophenyl group, 3,4,5-triiodophenyl group, 2,3,5,6-tetraiodophenyl group, pentaiodophenyl group, 2,3,5,6-tetraiodo-4-triiodomethylphenyl group, 2,3,5,6-tetraiodo-4-pentaiodophenylphenyl group, periodo-1-naphthyl group, periodo-2-naphthyl group and the like.

The (halogenated alkyl)aryl group represented by $R^6$ includes a 2-(trifluoromethyl)phenyl group, 3-(trifluoromethyl)phenyl group, 4-(trifluoromethyl)phenyl group, 2,6-bis(trifluoromethyl)phenyl group, 3,5-bis(trifluoromethyl)phenyl group, 2,4,6-tris(trifluoromethyl)phenyl group, 3,4,5-tris(trifluoromethyl)phenyl group and the like.

The cyanated aryl group represented by $R^6$ includes a 2-cyanophenyl group, 3-cyanophenyl group, 4-cyanophenyl group and the like.

The nitrated aryl group represented by $R^6$ includes a 2-nitrophenyl group, 3-nitrophenyl group, 4-nitrophenyl group and the like.

The hydrocarbyloxycarbonyl group represented by $R^6$ includes an alkoxycarbonyl group, aralkyloxycarbonyl group, aryloxycarbonyl group and the like, more specifically a methoxycarbonyl group, ethoxycarbonyl group, n-propoxycarbonyl group, isopropoxycarbonyl group, phenoxycarbonyl group and the like.

The halogenated hydrocarbyloxycarbonyl group represented by $R^6$ includes a halogenated alkoxycarbonyl group, halogenated aralkyloxycarbonyl group, halogenated aryloxycarbonyl group and the like, more specifically a trifluoromethoxycarbonyl group, pentafluorophenoxycarbonyl group and the like.

$R^6$ represents preferably a halogenated hydrocarbyl group, more preferably a halogenated alkyl group or halogenated aryl group, further preferably a fluorinated alkyl group, fluorinated aryl group, chlorinated alkyl group or chlorinated aryl group, and particularly preferably a fluorinated alkyl group or fluorinated aryl group. The fluorinated alkyl group includes preferably a fluoromethyl group, difluoromethyl group, trifluoromethyl group, 2,2,2-trifluoroethyl group, 2,2,3,3,3-pentafluoropropyl group, 2,2,2-trifluoro-1-trifluoromethylethyl group or 1,1-bis(trifluoromethyl)-2,2,2-trifluoroethyl group, more preferably a trifluoromethyl group, 2,2,2-trifluoro-1-trifluoromethylethyl group or 1,1-bis(trifluoromethyl)-2,2,2-trifluoroethyl group. The fluorinated aryl group includes preferably a 2-fluorophenyl group, 3-fluorophenyl group, 4-fluorophenyl group, 2,4-difluorophenyl group, 2,6-difluorophenyl group, 3,4-difluorophenyl group, 3,5-difluorophenyl group, 2,4,6-trifluorophenyl group, 3,4,5-trifluorophenyl group, 2,3,5,6-tetrafluorophenyl group, pentafluorophenyl group, 2,3,5,6-tetrafluoro-4-trifluoromethylphenyl group, 2,3,5,6-tetrafluoro-4-pentafluorophenylphenyl group, perfluoro-1-naphthyl group or perfluoro-2-naphthyl group, more preferably a 3,5-difluorophenyl group, 3,4,5-trifluorophenyl group or pentafluorophenyl group. The chlorinated alkyl group includes preferably a chloromethyl group, dichloromethyl group, trichloromethyl group, 2,2,2-trichloroethyl group, 2,2,3,3,3-pentachloropropyl group, 2,2,2-trichloro-1-trichloromethylethyl group or 1,1-bis(trichloromethyl)-2,2,2-trichloroethyl group. The chlorinated aryl group includes preferably a 4-chlorophenyl group, 2,6-dichlorophenyl group, 3.5-dichlorophenyl group, 2,4,6-trichlorophenyl group, 3,4,5-trichlorophenyl group or pentachlorophenyl group.

$T^2$ in the formula (7) represents an oxygen atom, sulfur atom, nitrogen atom or phosphorus atom, preferably a nitrogen atom or oxygen atom, and more preferably an oxygen atom.

s in the formula (7) represents the atomic valence of $T^2$, and when $T^2$ represents an oxygen atom or sulfur atom, s represents 2, and when $T^2$ represents a nitrogen atom or phosphorus atom, s represents 3.

$R^7$ in the formula (7) represents a hydrocarbyl group or halogenated hydrocarbyl group. The hydrocarbyl group represented by $R^7$ includes an alkyl group, aralkyl group, aryl group and the like, and those exemplified as the alkyl group, aralkyl group and aryl group represented by L can be exemplified. The halogenated hydrocarbyl group represented by $R^7$ includes halogenated hydrocarbyl groups such as a halogenated alkyl group, halogenated aralkyl group, halogenated aryl group, (halogenated alkyl)aryl group and the like, etc., and those exemplified as the halogenated alkyl group, halogenated aryl group and (halogenated alkyl)aryl group represented by $R^6$ can be exemplified.

$R^7$ represents preferably a halogenated hydrocarbyl group, more preferably a fluorinated hydrocarbyl group.

The compound of the formula (5) as the component (b1) includes compounds in which $M^3$ represents a zinc atom, that is, dialkylzincs such as dimethylzinc, diethylzinc, di-n-propylzinc, diisopropylzinc, di-n-butylzinc, diisobutylzinc, di-n-hexylzinc and the like; diarylzincs such as diphenylzinc, dinaphthylzinc, bis(pentafluorophenyl)zinc and the like; dialkenylzincs such as diallylzinc and the like; bis(cyclopentadienyl)zinc; halogenated alkylzincs such as methylzinc chloride, ethylzinc chloride, n-propylzinc chloride, isopropylzinc chloride, n-butylzinc chloride, isobutylzinc chloride, n-hexylzinc chloride, methylzinc bromide, ethylzinc bromide, n-propylzinc bromide, isopropylzinc bromide, n-butylzinc bromide, isobutylzinc bromide, n-hexylzinc bromide, methylzinc iodide, ethylzinc iodide, n-propylzinc iodide, isopropylzinc iodide, n-butylzinc iodide, isobutylzinc iodide, n-hexylzinc iodide and the like; halogenated zincs such as zinc fluoride, zinc chloride, zinc bromide, zinc iodide and the like; etc.

The compound of the formula (5) as the component (b1) includes preferably dialkylzincs, further preferably dimethylzinc, diethylzinc, di-n-propylzinc, diisopropylzinc, di-n-butylzinc, diisobutylzinc or di-n-hexylzinc, and particularly preferably dimethylzinc or diethylzinc.

The compound of the formula (6) as the component (b2) includes an amine, phosphine, alcohol, thiol, phenol, thiophenol, naphthol, naphthylthiol, carboxylic acid compound and the like.

The amine includes di(fluoromethyl)amine, bis(difluoromethyl)amine, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, bis(2-fluorophenyl)amine, bis(3-fluorophenyl)amine, bis(4-fluorophenyl)amine, bis(2,6-difluorophenyl)amine, bis(3,5-difluorophenyl)amine, bis(2,4,6-trifluorophenyl)amine, bis(3,4,5-trifluorophenyl)amine, bis(pentafluorophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, (3-cyanophenyl)amine, bis(4-cyanophenyl)amine, bis(2-nitrophenyl)amine, bis(3-nitrophenyl)amine, bis(4-nitrophenyl)amine, bis(1H,1H-perfluorobutyl)amine, bis(1H,1H-perfluoropentyl)amine, bis(1H,1H-perfluorohexyl)amine, bis(1H,1H-perfluorooctyl)amine, bis(1H,1H-perfluorododecyl)amine, bis(1H,1H-perfluoropentadecyl)amine, bis(1H,1H-perfluoroeicosyl)amine and the like. Further, amines obtained by changing fluoro in these amines into chloro, bromo or iodo are mentioned.

As the phosphine, compounds obtained by changing a nitrogen atom in the above-described amines into a phosphorus atom are mentioned. These phosphines are compounds in which an amine in the above-described amines is substituted by a phosphine.

The alcohol includes fluoromethanol, difluoromethanol, trifluoromethanol, 2,2,2-trifluoroethanol, 2,2,3,3,3-pentafluoropropanol, 2,2,2-trifluoro-1-trifluoromethylethanol, 1,1-bis(trifluoromethyl)-2,2,2-trifluoroethanol, 1H,1H-perfluorobutanol, 1H,1H-perfluoropentanol, 1H,1H-perfluorohexanol, 1H,1H-perfluorooctanol, 1H,1H-perfluorododecanol, 1H,1H-perfluoropentadecanol, 1H,1H-perfluoroeicosanol and the like. Further mentioned are alcohols obtained by changing fluoro in these alcohols into chloro, bromo or iodo.

As the thiol, compounds obtained by changing an oxygen atom in the above-described alcohols into a sulfur atom are mentioned. These thiols are compounds in which nol in the above-described alcohols is substituted by nthiol.

The phenol includes 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol and the like. Further mentioned are phenols obtained by changing fluoro in these phenols into chloro, bromo or iodo.

As the thiophenol, compounds obtained by changing an oxygen atom in the above-described phenols into a sulfur atom are mentioned. These thiophenols are compounds in which phenol in the above-described phenols is substituted by thiophenol.

The naphthol includes perfluoro-1-naphthol, perfluoro-2-naphthol, 4,5,6,7,8-pentafluoro-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 8-nitrophenol, 4-nitrophenol and the like. Further mentioned are naphthols obtained by changing fluoro in these naphthols into chloro, bromo or iodo.

As the naphthylthiol, compounds obtained by changing an oxygen atom in the above-described naphthols into a sulfur atom are mentioned. These naphthylthiols are compounds in which naphthol in the above-described naphthols is substituted by naphthylthiol.

Examples of the carboxylic acid compound include pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid, perfluorododecanoic acid and the like.

The compound of the formula (6) as the component (b2) is preferably an amine, alcohol or phenol compound, and the amine is preferably bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine or bis(pentafluorophenyl)amine, the alcohol is preferably trifluoromethanol, 2,2,2-trifluoroethanol, 2,2,3,3,3-pentafluoropropanol, 2,2,2-trifluoro-1-trifluoromethylethanol or 1,1-bis(trifluoromethyl)-2,2,2-trifluoroethanol, the phenol is preferably 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol or 3,4,5-tris(trifluoromethyl)phenol.

The compound of the formula (6) as the component (b2) is more preferably bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol, further preferably 3,5-difluorophenol, 3,4,5-trifluorophenol, pentafluorophenol or 1,1-bis(trifluoromethyl)-2,2,2-trifluoroethanol.

The compound of the formula (7) as the component (b3) includes water, hydrogen sulfide, amine, aniline compound and the like.

The amine includes alkylamines such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, n-eicosylamine and the like; aralkylamines such as benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphthylmethylamine, anthracenylmethylamine and the like; allylamine; cyclopentadienylamine, and the like.

The amine includes halogenated alkylamines such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine and the like, etc. Further mentioned are amines obtained by changing fluoro in these amines into chloro, bromo or iodo.

The aniline compound includes aniline, naphthylamine, anthracenylamine, 2-methylaniline, 3-methylaniline, 4-methylaniline, 2,3-dimethylaniline, 2,4-dimethylaniline, 2,5-dimethylaniline, 2,6-dimethylaniline, 3,4-dimethylaniline, 3,5-dimethylaniline, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline, pentaethylaniline and the like. Further mentioned are aniline compounds obtained by changing ethyl in these aniline compounds into n-propyl, isopropyl, n-butyl, sec-butyl, text-butyl, n-pentyl, neopentyl, n-hexyl, n-octyl, n-decyl, n-dodecyl, n-tetradecyl and the like.

The aniline compound includes 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl)aniline, 3,4,5-tri(trifluoromethyl)aniline and the like. Further mentioned are aniline compounds obtained by changing fluoro in these aniline compounds into chloro, bromo, iodo and the like.

The compound of the formula (7) as the component (b3) is preferably water, hydrogen sulfide, methylamine, ethylamine, n-propylamine, isopropylamine, n-butylamine, sec-butylamine, tert-butylamine, isobutylamine, n-octylamine, aniline, 2,6-dimethylaniline, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl) aniline, 2,6-bis(trifluoromethyl)aniline, 3,5-bis(trifluoromethyl)aniline, 2,4,6-tris(trifluoromethyl)aniline or 3,4,5-tris (trifluoromethyl)aniline, particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline or 3,4,5-tris(trifluoromethyl)aniline, and most preferably water or pentafluoroaniline.

As the particulate carrier as the component (b4), solid substances which are insoluble in a solvent for preparation of a polymerization catalyst or a polymerization solvent are suitably used, porous substances are more suitably used, inorganic substances or organic polymers are further suitably used, and inorganic substances are particularly suitably used.

It is preferable that the particulate carrier as the component (b4) is one having uniform particle size, and the volume-based geometric standard deviation of the particle size of the particulate carrier as the component (b4) is preferably 2.5 or less, more preferably 2.0 or less and further preferably 1.7 or less.

The inorganic substance as the particulate carrier as the component (b4) includes an inorganic oxide, clay, clay mineral and the like. Two or more of them may be mixed and used.

The inorganic oxide includes $SiO_2$, $Al_2O_3$, $MgO$, $ZrO_2$, $TiO_2$, $B_2O_3$, $CaO$, $ZnO$, $BaO$, $ThO_2$, $SiO_2$—$MgO$, $SiO_2$—$Al_2O_3$, $SiO_2$—$TiO_2$, $SiO_2$—$V_2O_5$, $SiO_2$—$Cr_2O_3$, $SiO_2$—$TiO_2$—$MgO$, and a mixture composed of two or more of these compounds. Of these inorganic oxides, preferable are $SiO_2$ and/or $Al_2O_3$, and particularly, $SiO_2$ (silica) is preferable. The above-described inorganic oxide may contain a small amount of carbonate, sulfate, nitrate or oxide component such as $Na_2CO_2$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ and the like.

Though a hydroxyl group is usually generated and present on the surface of the inorganic oxide, modified inorganic oxides obtained by substituting an active hydrogen of the surface hydroxyl group by various substituents may also be used as the inorganic oxide. As the modified inorganic oxide, mentioned are inorganic oxides obtained by contact with, for example, trialkyl chlorosilanes such as trimethyl chlorosilane, tert-butyl dimethyl chlorosilane and the like; triaryl chlorosilanes such as triphenyl chlorosilane and the like; dialkyl dichlorosilanes such as dimethyl dichlorosilane and the like; diaryl dichlorosilanes such as diphenyl dichlorosilane and the like; alkyl trichlorosilanes such as methyl trichlorosilane and the like; aryl trichlorosilanes such as phenyl trichlorosilane and the like; trialkyl alkoxy silanes such as trimethyl methoxy silane and the like; triaryl alkoxy silanes such as triphenyl methoxy silane and the like; dialkyl dialkoxy silanes such as dimethyl dimethoxy silane and the like; diaryl dialkoxy silanes such as diphenyl dimethoxysilane and the like; alkyl trialkoxy silanes such as methyl trimethoxy silane and the like; aryl trialkoxy silanes such as phenyl trimethoxy silane and the like; tetraalkoxy silanes such as tetramethoxy silane and the like; alkyl disilazanes such as 1,1,1,3,3,3-hexamethyl disilazane and the like; tetrachlorosilane; alcohols such as methanol, ethanol and the like; phenol; dialkylmagnesiums such as dibutylmagnesium, butylethylmagnesium, butyloctylmagnesium and the like; alkyllithiums such as butyllithium and the like; etc.

Further exemplified are inorganic oxides obtained by contacting with a trialkylaluminum, then, contacting with a dialkylamine such as diethylamine, diphenylamine and the like, an alcohol such as methanol, ethano and the like, and phenol.

In some inorganic oxides, the strength of the inorganic oxide itself is enhanced in some cases by hydrogen bond between hydroxyl groups. In this case, if all active hydrogens of the surface hydroxyl groups are substituted by various substituents, the particle strength may lower or the like. Thus, there is no need to substitute necessarily all active hydrogens of the surface hydroxyl groups of the inorganic oxide, and the substitution ratio of the surface hydroxyl groups may be appropriately determined. The method for varying the substitution ratio of the surface hydroxyl groups is not particularly restricted. As this method, for example, a method of changing the use amount of a compound to be used for contact is exemplified.

The clay or clay mineral includes kaolin, bentonite, kibushi clay, gairome clay, allophane, hisingerite, bairofiraito, talc, mica group, smectite, montmorillonite group, hectorite, laponite, saponite, vermiculite, chlorite group, palygorskite, kaolinite, nacrite, dickite, halloysite and the like. Of them, preferable are smectite, montmorillonite, hectorite, laponite and saponite, further preferable are montmorillonite and hectorite.

As the inorganic substance, inorganic oxides suitably used. It is preferable that the inorganic substance is dried to substantially remove water, and those dried by a heating treatment are preferable. The heating treatment is carried out at a temperature of 100 to 1500° C., preferably 100 to 1000° C., further preferably 200 to 800° C., usually, for an inorganic substance of which water content cannot be visually confirmed. The heating time is preferably 10 minutes to 50 hours, more preferably 1 hour to 30 hours. The heat dry method includes a method in which a dried inert gas (for example, nitrogen, argon or the like) is allowed to flow at a constant flow rate during heating, thereby attaining drying, a method in which heating is carried out under reduced pressure, etc.

The average particle size of the inorganic substance is usually 1 to 5000 μm, preferably 5 to 1000 μm, more preferably 10 to 500 μm, and further preferably 10 to 100 μm. The pore volume is preferably 0.1 ml/g or more, more preferably 0.3 to 10 ml/g. The specific surface area is preferably 10 to 1000 $m^2/g$, more preferably 100 to 500 $m^2/g$.

As the organic polymer as the particulate carrier as the component (b4), preferable are polymers having a functional group carrying an active hydrogen or a non-proton-donating Lewis basic functional group.

The functional group carrying an active hydrogen includes a primary amino group, secondary amino group, imino group, amide group, hydrazide group, amidino group, hydroxy group, hydroperoxy group, carboxyl group, formyl group, carbamoyl group, sulfonic group, sulfinic group, sulfenic group, thiol group, thioformyl group, pyrrolyl group, imidazolyl group, piperidyl group, indazolyl group, carbazolyl group and the like. Preferable is a primary amino group, secondary amino group, imino group, amide group, imide group, hydroxy group, formyl group, carboxyl group, sulfonic group or thiol group. Particularly preferable is a primary amino group, secondary amino group, amide group or hydroxy group. These groups may have substitution by a halogen atom or a hydrocarbyl group having 1 to 20 carbon atoms.

The non-proton-donating Lewis basic functional group is a functional group having a Lewis base portion having no active hydrogen atom, and includes a pyridyl group, N-substituted imidazolyl group, N-substituted indazolyl group, nitrile group, azide group, N-substituted imino group, N,N-substituted amino group, N,N-substituted aminooxy group, N,N,N-substituted hydrazino group, nitroso group, nitro group, nitrooxy group, furyl group, carbonyl group, thiocarbonyl group, alkoxy group, alkyloxycarbonyl group, N,N-substituted carbamoyl group, thioalkoxy group, substituted sulfinyl group, substituted sulfonyl group, substituted sulfonic group and the like. Preferable are heterocyclic groups, and further preferable are aromatic heterocyclic groups having an oxygen atom and/or nitrogen atom in the ring. Particularly preferable are a pyridyl group, N-substituted imidazolyl group and N-substituted indazolyl group, and most preferable is a pyridyl group. These groups may have substitution by a halogen atom or a hydrocarbyl group having 1 to 20 carbon atoms.

In the organic polymer, the content of the functional group carrying an active hydrogen or the non-proton-donating Lewis basic functional group is preferably 0.01 to 50 mmol/g and more preferably 0.1 to 20 mmol/g, in terms of the molar quantity of the functional group per unit gram of a polymer constituting the organic polymer.

As the method of producing a polymer having the functional group carrying an active hydrogen or the non-proton-donating Lewis basic functional group described above, there are mentioned, for example, a method in which a monomer having the functional group carrying an active hydrogen or the non-proton-donating Lewis basic functional group and at least one polymerizable unsaturated group is homopolymerized, and a method in which this monomer and other monomer having a polymerizable unsaturated group are copolymerized. In this case, it is preferable that, further, a crosslink-polymerizable monomer having two or more polymerizable unsaturated groups is also copolymerized together.

The above-described polymerizable unsaturated group includes alkenyl groups such as a vinyl group, allyl group and the like; alkynyl groups such as an ethyne group and the like.

The monomer having the functional group carrying an active hydrogen and at least one polymerizable unsaturated group includes a vinyl group-containing primary amine, vinyl group-containing secondary amine, vinyl group-containing amide compound, vinyl group-containing hydroxy compound and the like. Specific examples of the monomer include N-(1-ethenyl)amine, N-(2-propenyl)amine, N-(1-ethenyl)-N-methylamine, N-(2-propenyl)-N-methylamine, 1-ethenylamide, 2-propenylamide, N-methyl(1-ethenyl)amide, N-methyl(2-propenyl)amide, vinylalcohol, 2-propen-1-ol, 3-buten-1-ol and the like.

The monomer having the functional group having a Lewis base portion having no active hydrogen atom and at least one polymerizable unsaturated group includes vinylpyridine, vinyl (N-substituted) imidazole, vinyl (N-substituted) indazole and the like.

Examples of the other monomer having a polymerizable unsaturated group include ethylene, α-olefin, aromatic vinyl compound, cyclic olefin and the like. Specific examples of the monomer include ethylene, propylene, 1-butene, 1-hexene, 4-methyl-1-pentene, styrene, norbornene and dicyclopentadiene. These monomers may be used in combination. Preferable are ethylene and styrene. As the crosslink-polymerizable monomer having two or more polymerizable unsaturated groups, divinylbenzene and the like are mentioned.

The average particle size of the organic polymer is usually 1 to 5000 μm, preferably 5 to 1000 μm, and more preferably 10 to 500 μm. The pore volume thereof is preferably 0.1 ml/g or more, and more preferably 0.3 to 10 ml/g. The specific surface area thereof is preferably 10 to 1000 $m^2/g$, and more preferably 50 to 500 $m^2/g$.

It is preferable that the organic polymer is dried to substantially remove water, and those dried by a heating treatment are preferable. The heating treatment temperature is usually 30 to 400° C., preferably 50 to 200° C., further preferably 70 to 150° C., for an organic polymer of which water content cannot be visually confirmed. The heating time is preferably 10 minutes to 50 hours, more preferably 1 hour to 30 hours. The heat dry method includes a method in which a dried inert gas (for example, nitrogen, argon or the like) is allowed to flow at a constant flow rate during heating, thereby attaining drying, a method in which drying by heating is carried out under reduced pressure, and other methods.

The component (B) is formed by contacting the component (b1), component (b2), component (b3) and component (b4). The order of contacting the component (b1), component (b2), component (b3) and component (b4)) includes the following orders.

<1> The component (b1) and the component (b2) are brought into contact, a contacted substance obtained by this contact and the component (b3) are brought into contact, and a contacted substance obtained by this contact and the component (b4) are brought into contact.

<2> The component (b1) and the component (b2) are brought into contact, a contacted substance obtained by this contact and the component (b4) are brought into contact, and a contacted substance obtained by this contact and the component (b3) are brought into contact.

<3> The component (b1) and the component (b3) are brought into contact, a contacted substance obtained by this contact and the component (b2) are brought into contact, and a contacted substance obtained by this contact and the component (b4) are brought into contact.

<4> The component (b1) and the component (b3) are brought into contact, a contacted substance obtained by this contact and the component (b4) are brought into contact, and a contacted substance obtained by this contact and the component (b2) are brought into contact.

<5> The component (b1) and the component (b4) are brought into contact, a contacted substance obtained by this contact and the component (b2) are brought into contact, and a contacted substance obtained by this contact and the component (b3) are brought into contact.

<6> The component (b1) and the component (b4) are brought into contact, a contacted substance obtained by this contact and the component (b3) are brought into contact, and a contacted substance obtained by this contact and the component (b2) are brought into contact.

<7> The component (b2) and the component (b3) are brought into contact, a contacted substance obtained by this contact and the component (b1) are brought into contact, and a contacted substance obtained by this contact and the component (b4) are brought into contact.

<8> The component (b2) and the component (b3) are brought into contact, a contacted substance obtained by this contact and the component (b4) are brought into contact, and a contacted substance obtained by this contact and the component (b1) are brought into contact.

<9> The component (b2) and the component (b4) are brought into contact, a contacted substance obtained by this contact and the component (b1) are brought into contact, and a contacted substance obtained by this contact and the component (b3) are brought into contact.

<10> The component (b2) and the component (b4) are brought into contact, a contacted substance obtained by this contact and the component (b3) are brought into contact, and a contacted substance obtained by this contact and the component (b1) are brought into contact.

<11> The component (b3) and the component (b4) are brought into contact, a contacted substance obtained by this contact and the component (b1) are brought into contact, and a contacted substance obtained by this contact and the component (b2) are brought into contact.

<12> The component (b3) and the component (b4) are brought into contact, a contacted substance obtained by this contact and the component (b2) are brought into contact, and a contacted substance obtained by this contact and the component (b1) are brought into contact.

Contact with the component (b1), component (b2), component (b3) and component (b4) is preferably carried out under an inert gas atmosphere. The contact temperature is usually −100 to 300° C., preferably −80 to 200° C. The contact time is usually 1 minute to 200 hours, preferably 10 minutes to 100 hours. A solvent may be used in contact thereof, or these compounds may be directly brought into contact using no solvent.

In the case of use of a solvent, those not reacting with the component (b1), component (b2), component (b3) and component (b4) and contacted substances thereof are used. However, when the components are brought into contact in a stepwise fashion as described above, even a solvent reacting with a certain component in a certain stage can be used in other stages providing that it does not react with components in the other stages. That is, solvents in respective stages are mutually the same or different. Examples of the solvent include nonpolar solvents such as aliphatic hydrocarbon solvents, aromatic hydrocarbon solvents and the like; and polar solvents such as halide solvents, ether solvents, alcohol solvents, phenol solvents, carbonyl solvents, phosphoric acid derivatives, nitrile solvents, nitro compounds, amine solvents, sulfur compounds and the like. Specific examples thereof include aliphatic hydrocarbon solvents such as butane, pentane, hexane, heptane, octane, 2,2,4-trimethylpentane, cyclohexane and the like; aromatic hydrocarbon solvents such as benzene, toluene, xylene and the like; halide solvents such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene and the like; ether solvents such as dimethyl ether, diethyl ether, diisopropyl ether, di-n-butyl ether, methyltert-butyl ether, anisole, 1,4-dioxane, 1,2-dimethoxyethane, bis(2-methoxyethyl) ether, tetrahydrofuran, tetrahydropyran and the like; alcohol solvents such as methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethylene glycol, triethylene glycol, glycerin and the like; phenol solvents such as phenol, p-cresol and the like; carbonyl solvents such as acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone and the like; phosphoric acid derivatives such as hexamethylphosphoric triamide, triethyl phosphate and the like; nitrile solvents such as acetonitrile, propionitrile, succinonitrile, benzonitrile and the like; nitro compounds such as nitromethane, nitrobenzene and the like; amine solvents such as pyridine, piperidine, morpholine and the like; sulfur compounds such as dimethyl sulfoxide, sulfolane and the like.

When a contacted substance (c) obtained by contacting the component (b1), component (b2) and component (b3) is brought into contact with the component (b4), namely in the above-described methods <1>, <3> and <7>, preferable as the solvent (s1) used in the case of production of the contacted substance (c) are the above-described aliphatic hydrocarbon solvents, aromatic hydrocarbon solvents and ether solvents.

In contrast, preferable as the solvent (s2) used in the case of contacting the contacted substance (c) and the component (b4) are polar solvents. As the index showing the polarity of a solvent, $E_T^N$ value (C. Reichardt, "Solvents and Solvents Effects in Organic Chemistry", 2nd ed., VCH Verlag (1988).) and the like are known, and solvents satisfying the range of $0.8 \geq E_T^N \geq 0.1$ are particularly preferable.

Examples of such polar solvents include dichloromethane, dichlorodifluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethylene glycol, triethylene glycol, acetone, ethylmethyl ketone, cyclohexanone, acetic anhydride, ethyl acetate, butyl acetate, ethylene carbonate, propylene carbonate, N,N-dimethylformamide, N,N-dimethylacetamide, N-methyl2-pyrrolidone, hexamethylphosphoric triamide, triethyl phosphate, acetonitrile, propionitrile, succinonitrile, benzonitrile, nitromethane, nitrobenzene, ethylenediamine, pyridine, piperidine, morpholine, dimethyl sulfoxide, sulfolane and the like.

The solvent (s2) includes further preferably dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethylene glycol and triethylene glycol, particularly preferably di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol and cyclohexanol, and most preferably tetrahydrofuran, methanol, ethanol, 1-propanol and 2-propanol.

As the above-described solvent (s2), mixed solvents of these polar solvents and hydrocarbon solvents can be used. As the hydrocarbon solvent, compounds exemplified as the aliphatic hydrocarbon solvents and aromatic hydrocarbon solvents are used. Examples of the mixed solvents of polar solvents and hydrocarbon solvents include a hexane/methanol mixed solvent, hexane/ethanol mixed solvent, hexane/1-propanol mixed solvent, hexane/2-propanol mixed solvent, heptane/methanol mixed solvent, heptane/ethanol mixed solvent, heptane/1-propanol mixed solvent, heptane/2-propanol mixed solvent, toluene/methanol mixed solvent, toluene/ethanol mixed solvent, toluene/1-propanol mixed solvent, toluene/2-propanol mixed solvent, xylene/methanol mixed solvent, xylene/ethanol mixed solvent, xylene/1-propanol mixed solvent, xylene/2-propanol mixed solvent and the like. Preferable are a hexane/methanol mixed solvent, hexane/ethanol mixed solvent, heptane/methanol mixed solvent, heptane/ethanol mixed solvent, toluene/methanol mixed solvent, toluene/ethanol mixed solvent, xylene/methanol mixed solvent and xylene/ethanol mixed solvent. Further preferable are a hexane/methanol mixed solvent, hexane/ethanol mixed solvent, toluene/methanol mixed solvent and toluene/ethanol mixed solvent. Most preferable is a toluene/ethanol mixed solvent. In a toluene/ethanol mixed solvent, the ethanol fraction is preferably in the range of 10 to 50% by volume, further preferably 15 to 30% by volume.

When a contacted substance (c) obtained by contacting the component (b1), component (b2) and component (b3) is brought into contact with the component (b4), namely in the above-described methods <1>, <3> and <7>, hydrocarbon solvents can also be used as both the solvent (s1) and the solvent (s2). In this case, it is preferable that time from contacting the component (b1), component (b2) and component (b3) until contacting the resultant contacted substance (c) and the component (b4) is shorter. This time is preferably 0 to 5 hours, further preferably 0 to 3 hours, and most preferably 0 to 1 hour. The temperature for contacting the contacted substance (c) and the component (b4) is usually $-100°$ C. to $40°$ C., preferably $-20°$ C. to $20°$ C., and most preferably $-10°$ C. to $10°$ C.

In the above-described cases <2>, <5>, <6>, <8>, <9>, <10>, <11> and <12>, any of the above-described nonpolar solvents and polar solvents can be used. The nonpolar solvents are preferable. Since a contacted substance of the component (b1) and the component (b3), and a contacted substance obtained by contacting a contacted substance of the component (b1) and the component (b2) with the component (b3) are in general poorly soluble in a nonpolar solvent, when the component (b4) is present in the reaction system in production of, these contacted substances, the contacted substances are believed to deposit on the surface of the component (b4), thereby giving easier fixation thereof.

It is preferable that the use amounts of the component (b2) and the component (b3) per mol of the use amount of the component (b1) satisfy the following relational formula (I).

|atomic valence of $M^3$−molar quantity of component $(b2)$−2×molar quantity of component$(b3)$|≦1    (I)

The use amount of the component (b2) per mod of the use amount of the component (b1) is preferably 0.01 to 1.99 mol, more preferably 0.1 to 1.8 mol, further preferably 0.2 to 1.5 mol, and most preferably 0.3 to 1 mol. The preferable use amount, more preferable use amount, further preferable use amount and most preferable use amount of the component (b3) per mol of the use amount of the component (b1) are calculated based on the atomic valence of $M^3$, the use amount of the component (b2) per mol of the use amount of the component (b1) and the above-described relational formula (I), respectively.

The use amounts of the component (b1) and the component (b2) are regulated so that the amount of metal atoms derived from the component (b1) contained in the component (B) is preferably 0.1 mmol or more, more preferably 0.5 to 20 mmol, in terms of the mole number of metal atoms contained per g of the component (B).

For progressing the reaction more quickly, a heating process at higher temperature may be added after the contact as described above. In the heating process, it is preferable to use a solvent having higher boiling point for attaining higher temperature, and in carrying out the heating process, the solvent used in the contact may be substituted by other solvent having higher boiling point.

In the component (B), the component (b1), component (b2), component (b3) and/or component (b4) as raw materials may remain as unreacted substances as a result of such contact, however, it is preferable to previously perform a washing treatment for removing unreacted substances. The solvent used in this procedure may be the same as or different from the solvent used in the contact. Such a washing treatment is preferably carried out under an inert gas atmosphere. The contact temperature is usually $-100$ to $300°$ C., preferably $-80$ to $200°$ C. The contact time is usually 1 minute to 200 hours, preferably 10 minutes to 100 hours.

After such contact and washing treatment, it is preferable to distill off the solvent from the product, then, to perform drying at a temperature of $0°$ C. or higher under reduced pressure for 1 hour to 24 hours. It is carried out more preferably at a temperature of $0°$ C. to $200°$ C. for 1 hour to 24 hours, further preferably at a temperature of $10°$ C. to $200°$ C. for 1 hour to 24 hours, particularly preferably at a temperature of $10°$ C. to $160°$ C. for 2 hours to 18 hours, and most preferably at a temperature of $15°$ C. to $160°$ C. for 4 hours to 18 hours.

The co-catalyst component is preferably a solid catalyst component formed by contacting the above-described component (b1), component (b2), component (b3) and component (b4).

The metallocene compound (component (A)) is preferably a transition metal compound of the following formula [4] or a μ-oxo type transition metal compound dimer thereof.

$$L^2{}_a M^2 X^1{}_b \qquad [4]$$

(wherein, $M^2$ represents a transition metal atom in the periodic table, groups III to XI or lanthanoid series. $L^2$ represents a group having a cyclopentadiene-form anion skeleton, and when there exists a plurality of $L^2$, a plurality of $L^2$ may be mutually the same or different and, a plurality of $L^2$ may be mutually connected directly or may be connected via a linking group containing a carbon atom, silicon atom, nitrogen atom, oxygen atom, sulfur atom or phosphorus atom. $X^1$ represents a halogen atom, hydrocarbon group (excluding a group having a cyclopentadiene-form anion skeleton) or hydrocarbonoxy group, and when there exists a plurality of $X^1$, a plurality of $X^1$ may be mutually the same or different. $L^2$ and $X^1$ may be mutually connected directly or may be connected via a linking group containing a carbon atom, silicon atom, nitrogen atom, oxygen atom, sulfur atom or phosphorus atom. a represents an integer satisfying $0<a\leqq8$, and b represents an integer satisfying $0<b\leqq8$.)

Examples of the transition metal atom in the periodic table (IUPAC 1989), groups III to XI or lanthanoid series, represented by $M^2$ in the formula [4], include a scandium atom, yttrium atom, titanium atom, zirconium atom, hafnium atom, vanadium atom, niobium atom, tantalum atom, chromium atom, iron atom, ruthenium atom, cobalt atom, rhodium atom, nickel atom, palladium atom, samarium atom, ytterbium atom and the like, preferably a titanium atom, zirconium atom, hafnium atom, vanadium atom, chromium atom, iron atom, cobalt atom or nickel atom, more preferably a titanium atom, zirconium atom or hafnium atom, and further preferably a zirconium atom.

The group having a cyclopentadiene-form anion skeleton, represented by $L^2$ in the formula [4], includes a η5-(substituted) cyclopentadienyl group, η5-(substituted) indenyl group, η5-(substituted) fluorenyl group and the like. Specifically exemplified are a η5-cyclopentadienyl group, η5-methylcyclopentadienyl group, η5-ethylcyclopentadienyl group, η5-n-butylcyclopentadienyl group, η5-tert-butylcyclopentadienyl group, η5-1,2-dimethylcyclopentadienyl group, η5-1,3-dimethylcyclopentadienyl group, η5-1-methyl-2-ethylcyclopentadienyl group, η5-1-methyl-3-ethylcyclopentadienyl group, η5-1-tert-butyl-2-methylcyclopentadienyl group, η5-1-tert-butyl-3-methylcyclopentadienyl group, η5-1-methyl-2-isopropylcyclopentadienyl group, η5-1-methyl-3-isopropylcyclopentadienyl group, η5-1-methyl-2-n-butylcyclopentadienyl group, η5-1-methyl-3-n-butylcyclopentadienyl group, η5-1,2,3-trimethylcyclopentadienyl group, η5-1,2,4-trimethylcyclopentadienyl group, η5-tetramethylcyclopentadienyl group, η5-pentamethylcyclopentadienyl group, η5-indenyl group, η5-4,5,6,7-tetrahydroindenyl group, η5-2-methylindenyl group, η5-3-methylindenyl group, η5-4-methylindenyl group, η5-5-methylindenyl group, η5-6-methylindenyl group, η5-7-methylindenyl group, η5-2-tert-butylindenyl group, η5-3-tert-butylindenyl group, η5-4-text-butylindenyl group, η5-5-tert-butylindenyl group, η5-6-tert-butylindenyl group, η5-7-tert-butylindenyl group, η5-2,3-dimethylindenyl group, η5-4,7-dimethylindenyl group, η5-2,4,7-trimethylindenyl group, η5-2-methyl4-isopropylindenyl group, η5-4,5-benzindenyl group, η5-2-methyl4,5-benzindenyl group, η5-4-phenylindenyl group, η5-2-methyl-5-phenylindenyl group, η5-2-methyl-4-phenylindenyl group, η5-2-methyl-4-naphthylindenyl group, η5-fluorenyl group, η5-2,7-dimethylfluorenyl group, η5-2,7-di-tert-butylfluorenyl group, and substituted groups thereof, and the like. In the present specification, "η5-" is sometimes omitted for the name of a transition metal compound.

When there exists a plurality of $L^2$, a plurality of $L^2$ may be mutually connected directly, or may be connected via a linking group containing a carbon atom, silicon atom, nitrogen atom, oxygen atom, sulfur atom or phosphorus atom. Such a linking group includes alkylene groups such as an ethylene group, propylene group and the like; substituted alkylene groups such as a dimethylmethylene group, diphenylmethylene group and the like; a silylene group, and substituted silylene groups such as dimethylsilylene group, diphenylsilylene group, tetramethyldisilylene group and the like; hetero atoms such as a nitrogen atom, oxygen atom, sulfur atom, phosphorus atom and the like.

Examples of the halogen atom represented by $X^1$ in the formula [4] include a fluorine atom, chlorine atom, bromine atom and iodine atom, examples of the hydrocarbon group represented by $X^1$ include an alkyl group, aralkyl group, aryl group, alkenyl group and the like, and examples of the hydrocarbonoxy group represented by $X^1$ include an alkoxy group, aralkyloxy group, aryloxy group and the like.

Examples of the alkyl group include a methyl group, ethyl group, n-propyl group, isopropyl group, n-butyl group, sec-butyl group, tert-butyl group, isobutyl group, n-pentyl group, neopentyl group, amyl group, n-hexyl group, n-octyl group, n-decyl group, n-dodecyl group, n-pentadecyl group, n-eicosyl group and the like, and any of these alkyl groups may be partially substituted by a halogen atom such as a fluorine atom, chlorine atom, bromine atom, iodine atom and the like; an alkoxy group such as a methoxy group, ethoxy group and the like; and aryloxy group such as a phenoxy group and the like, or an aralkyloxy group such as a benzyloxy group and the like. Examples of the alkyl group substituted by a halogen atom include a fluoromethyl group, trifluoromethyl group, chloromethyl group, trichloromethyl group, fluoroethyl group, pentafluoroethyl group, perfluoropropyl group, perfluorobutyl group, perfluorohexyl group, perfluorooctyl group, perchloropropyl group, perchlorobutyl group, perbromopropyl group and the like.

Examples of the aralkyl group include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, naphthylmethyl group, anthracenylmethyl group and the like, and any of these aralkyl groups may be partially substituted by a halogen atom such as a fluorine atom, chlorine atom, bromine atom, iodine atom and the like; an alkoxy group such as a methoxy group, ethoxy group and the like; an aryloxy group such as a phenoxy group and the like, or an aralkyloxy group such as a benzyloxy group and the like.

Examples of the aryl group include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group and the like, and any of these aryl groups may be partially substituted by a halogen atom such as a fluorine atom, chlorine atom, bromine atom, iodine atom and the like; an alkoxy group such as a methoxy group, ethoxy group and the like; an aryloxy group such as a phenoxy group and the like, or an aralkyloxy group such as a benzyloxy group and the like.

Examples of the alkenyl group include an allyl group, methallyl group, crotyl group, 1,3-diphenyl-2-propenyl group and the like.

Examples of the alkoxy group include a methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodesoxy group, n-pentadesoxy group, n-icosoxy group and the like, and any of these alkoxy groups may be partially substituted by a halogen atom such as a fluorine atom, chlorine atom, bromine atom, iodine atom and the like; an alkoxy group such as a methoxy group, ethoxy group and the like; an aryloxy group such as a phenoxy group and the like, or an aralkyloxy group such as a benzyloxy group and the like.

Examples of the aralkyloxy group include a benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, naphthylmethoxy group, anthracenylmethoxy group and the like, and any of these aralkyloxy groups may be partially substituted by a halogen atom such as a fluorine atom, chlorine atom, bromine atom, iodine atom and the like; an alkoxy group such as a methoxy group, ethoxy group and the like; an aryloxy group such as a phenoxy group and the like, or an aralkyloxy group such as a benzyloxy group and the like.

Examples of the aryloxy group include a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2-tert-butyl-3-methylphenoxy group, 2-tert-butyl-4-methylphenoxy group, 2-tert-butyl-5-methylphenoxy group, 2-tert-butyl-6-methylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 2-tert-butyl-3,4-dimethylphenoxy group, 2-tert-butyl-3,5-dimethylphenoxy group, 2-tert-butyl-3,6-dimethylphenoxy group, 2,6-di-tert-butyl-3-methylphenoxy group, 2-tert-butyl-4,5-dimethylphenoxy group, 2,6-di-text-butyl-4-methylphenoxy group, 3,4,5-trimethylphenoxy group, 2,3,4,5-tetramethylphenoxy group, 2-tert-butyl-3,4,5-trimethylphenoxy group, 2,3,4,6-tetramethylphenoxy group, 2-tert-butyl-3,4,6-trimethylphenoxy group, 2,6-di-tert-butyl-3,4-dimethylphenoxy group, 2,3,5,6-tetramethylphenoxy group, 2-tert-butyl-3,5,6-trimethylphenoxy group, 2,6-di-tert-butyl-3,5-dimethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like, and any of these aryloxy groups may be partially substituted by a halogen atom such as a fluorine atom, chlorine atom, bromine atom, iodine atom and the like; an alkoxy group such as a methoxy group, ethoxy group and the like; an aryloxy group such as a phenoxy group and the like, or an aralkyloxy group such as a benzyloxy group and the like.

$L^2$ and $X^1$ may be connected directly or may be connected via a linking group containing a carbon atom, silicon atom, nitrogen atom, oxygen atom, sulfur atom or phosphorus atom. Such a linking group includes alkylene groups such as an ethylene group, propylene group and the like; substituted alkylene groups such as a dimethylmethylene group, diphenylmethylene group and the like; or substituted silylene groups such as a silylene group, dimethylsilylene group, diphenylsilylene group, tetramethyldisilylene group and the like; hetero atoms such as a nitrogen atom, oxygen atom, sulfur atom, phosphorus atom and the like.

In the formula [4], a represents an integer satisfying $0<a\leq 8$ and b represents an integer satisfying $0<b\leq 8$, and are appropriately selected depending on the valence of $M^2$. $M^2$ represents preferably a transition metal compound of group IV of the element periodic table. When $M^2$ is a transition metal compound of group IV of the element periodic table, a represents an integer satisfying $1\leq a\leq 3$ and b represents an integer satisfying $1\leq b\leq 3$ and $a+b\leq 4$, and preferably, a is 2 and b is 2.

Examples of the metallocene compound include bis(cyclopentadienyl)titanium dichloride, bis(methylcyclopentadienyl)titanium dichloride, bis(ethylcyclopentadienyl)titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis(1-methyl-2-ethylcyclopentadienyl)titanium dichloride, bis(1-methyl-3-ethylcyclopentadienyl)titanium dichloride, bis(1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl)titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl4-isopropylindenyl)titanium dichloride, dimethylsilylenebis(4,5-benzindenyl)titanium dichloride, dimethylsilylenebis(2-methyl4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene (cyclopentadienyl) (fluorenyl) titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene (tetramethylcyclopentadienyl)(indenyl)titanium dichloride, dimethylsilylene(indenyl)(fluorenyl)titanium dichloride, dimethylsilylenebis(fluorenyl)titanium dichloride, dimethylsilylene(cyclopentadienyl)(tetramethylcyclopentadienyl)titanium dichloride, dimethylsilylene(tetramethylcyclopentadienyl)(fluorenyl)titanium dichloride, cyclopentadienyltitanium trichloride, pentamethylcyclopentadienyltitanium trichloride, cyclopentadienyl(dimethylamide)titanium dichloride, cyclopentadienyl(phenoxy)titanium dichloride, cyclopentadienyl(2,6-dimethylphenoxy) titanium dichloride, cyclopentadienyl(2,6-diisopropylphenoxy)titanium dichloride, cyclopentadienyl (2,6-di-tert-butylphenoxy)titanium dichloride, pentamethylcyclopentadienyl(2,6-dimethylphenoxy)titanium dichloride, pentamethylcyclopentadienyl(2,6-diisopropylphenoxy)titanium dichloride, pentamethylcyclopentadienyl(2,6-tort-butylphenoxy)titanium dichloride, indenyl(2,6-diisopropylphenoxy)titanium dichloride, fluorenyl(2,6-diisopropylphenoxy)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl) (3-tert-butyl-2-phenoxy) titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene (cyclopentadienyl)(3-tert-butyl-5-methoxy-2-phenoxy) titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy) titanium dichloride, dimethylsilylene(cyclopentadienyl)(3-phenyl-2-phenoxy)titanium dichloride, dimethylsilylene(cyclopentadienyl)(1-naphthoxy-2-yl)titanium dichloride, dimethylsilylene(methylcyclopentadienyl)(2-phenoxy) titanium dichloride, dimethylsilylene(methylcyclopentadienyl) (3-methyl-2-phenoxy)titanium dichloride, dimethylsilylene (methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene (methylcyclopentadienyl)(3-tert-butyl-5-methyl-2-phenoxy) titanium dichloride, dimethylsilylene (methylcyclopentadienyl)(3,5-di-tert-butyl-2-phenoxy) titanium dichloride, dimethylsilylene (methylcyclopentadienyl)(5-methyl3-phenyl-2-phenoxy) titanium dichloride, dimethylsilylene (methylcyclopentadienyl)(3-tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene (methylcyclopentadienyl)(3-tert-butyl-5-methoxy-2-phenoxy)titanium dichloride, dimethylsilylene (methylcyclopentadienyl)(3-tert-butyl-5-chloro-2-phenoxy) titanium dichloride, dimethylsilylene (methylcyclopentadienyl)(3,5-diamyl-2-phenoxy)titanium dichloride, dimethylsilylene(methylcyclopentadienyl)(3-phenyl-2-phenoxy)titanium dichloride, dimethylsilylene (methylcyclopentadienyl)(1-naphthoxy-2-yl)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy) titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy) titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl3-trimethylsilyl-2-phenoxy)titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthoxy-2-yl)titanium dichloride, dimethylsilylene(tert-butylcyclopentadienyl)(2-phenoxy) titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-diamyl-2-phenoxy)titanium dichloride, dimethylsilylene(tert-butylcyclopentadienyl)(3- phenyl-2-phenoxy)titanium dichloride, dimethylsilylene(tert-butylcyclopentadienyl)(1-naphthoxy-2-yl)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy) titanium dichloride, dimethylsilylene(tetramethylcyclopentadienyl)(3,5-diamyl-2-phenoxy) titanium dichloride, dimethylsilylene(tetramethylcyclopentadienyl)(3-phenyl-2-phenoxy) titanium dichloride, dimethylsilylene(tetramethylcyclopentadienyl)(1-naphthoxy-2-yl)titanium dichloride, dimethylsilylene(trimethylsilyl-cyclopentadienyl)(2-phenoxy)titanium dichloride, dimethylsilylene(trimethylsilyl-cyclopentadienyl)(3-methyl-2-phenoxy)titanium dichloride, dimethylsilylene(trimethylsilyl-cyclopentadienyl)(3,5-dimethyl-2-phenoxy)titanium dichloride, dimethylsilylene(trimethylsilyl-cyclopentadienyl)(3-tert-butyl-2-phenoxy)titanium dichloride, dimethylsilylene(trimethylsilyl-cyclopentadienyl)(3-tert-butyl-5-methyl-2-phenoxy) titanium dichloride, dimethylsilylene(trimethylsilyl-cyclopentadienyl)(3,5-di-tert-butyl-2-phenoxy)titanium dichloride, dimethylsilylene(trimethylsilyl-cyclopentadienyl)(5-methyl-3-phenyl-2-phenoxy)titanium dichloride, dimethylsilylene(trimethylsilyl-cyclopentadienyl)(3-tert-butyldimethylsilyl-5-methyl-2-phenoxy)titanium dichloride, dimethylsilylene(trimethylsilyl-cyclopentadienyl)(5-methyl-3-trimethylsilyl-2-phenoxy)titanium dichloride, dimethylsilylene(trimethylsilyl-cyclopentadienyl)(3-tert-butyl-5-methoxy-2-phenoxy)titanium dichloride, dimethylsilylene(trimethylsilyl-cyclopentadienyl)(3-tert-butyl-5-chloro-2-phenoxy)titanium dichloride, dimethylsilylene(trimethylsilyl-cyclopentadienyl)(3,5-diamyl-2-phenoxy) titanium dichloride, dimethylsilylene(trimethylsilyl-cyclopentadienyl)(3-phenyl-2-phenoxy)titanium dichloride, dimethylsilylene(trimethylsilyl-cyclopentadienyl)(1-naphthoxy-2-yl)titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphthoxy-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy) titanium dichloride, dimethylsilylene(fluorenyl)(1-naphthoxy-2-yl)titanium dichloride, (tert-butylamide)tetramethylcyclopentadienyl-1,2-ethanediyltitanium dichloride, (methylamide)tetramethylcyclopentadienyl-1,2-ethanediyltitanium dichloride, (ethylamide)tetramethylcyclopentadienyl-1,2-ethanediyltitanium dichloride, (tert-butylamide)tetramethylcyclopentadienyldimethylsilanetitanium dichloride, (benzylamide)tetramethylcyclopentadienyldimethylsilanetitanium dichloride, (phenyl phosphide)tetramethylcyclopentadienyldimethylsilanetitanium dichloride, (tert-butylamide)indenyl-1,2-ethanediyltitanium dichloride, (tert-butylamide)tetrahydroindenyl-1,2-ethanediyltitanium dichloride, (tert-butylamide)fluorenyl-1,2-ethanediyltitanium dichloride, (tert-butylamide)indenyldimethylsilanetitanium dichloride, (tert-butylamide)tetrahydroindenyldimethylsilanetitanium dichloride, (tert-butylamide)fluorenyldimethylsilanetitanium dichloride, (dimethylaminomethyl)tetramethylcyclopentadienyltitanium(III) dichloride, (dimethylaminoethyl)tetramethylcyclopentadienyltitanium(III) dichloride, (dimethylaminopropyl)tetramethylcyclopentadienyltitanium(III) dichloride, (N-pyrrolidinylethyl)tetramethylcyclopentadienyltitanium dichloride, (B-dimethylaminoborabenzene)cyclopentadienyltitanium dichloride, cyclopentadienyl(9-mesitylboraanthracenyl)titanium dichloride and the like, and compounds obtained by changing titanium in these compounds into zirconium or hafnium, compounds obtained by changing (2-phenoxy) in these compounds into (3-phenyl-2-phenoxy), (3-trimethylsilyl-2-phenoxy) or (3-tert-butyldimethylsilyl-2-phenoxy), compounds obtained by changing dimethylsilylene in these compounds into methylene, ethylene, dimethylmethylene (isopropylidene), diphenylmethylene, diethylsilylene, diphenylsilylene or dimethoxysilylene, compounds obtained by changing dichloride in these compounds into difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide), compounds obtained by changing trichloride in these compounds into trifluoride, tribromide, triiodide, trimethyl, triethyl, triisopropyl, triphenyl, tribenzyl, trimethoxide, triethoxide, tri(n-propoxide), tri(isopropoxide), triphenoxide or tri(pentafluorophenoxide), and the like.

Examples of the μ-oxo type transition metal compound as the transition metal compound of the formula [4] include μ-oxobis[isopropylidene(cyclopentadienyl)(2-phenoxy)titanium chloride], μ-oxobis[isopropylidene(cyclopentadienyl)(3-tert-butyl-5-methyl-2-phenoxy)titanium chloride], μ-oxobis[isopropylidene(methylcyclopentadienyl)(2-phenoxy)titanium chloride], μ-oxobis[isopropylidene(methylcyclopentadienyl)(3-tert-butyl-5-methyl-2-phenoxy)titanium chloride], μ-oxobis[isopropylidene(tetramethylcyclopentadienyl)(2-phenoxy)titanium chloride], μ-oxobis[isopropylidene(tetramethylcyclopentadienyl)(3-tert-butyl-5-methyl-2-phenoxy)titanium chloride], μ-oxobis[dimethylsilylene(cyclopentadienyl)(2-phenoxy)titanium chloride], μ-oxobis[dimethylsilylene(cyclopentadienyl)(3-tert-butyl-5-methyl-2-phenoxy)titanium chloride], μ-oxobis[dimethylsilylene(methylcyclopentadienyl)(2-phenoxy)titanium chloride], μ-oxobis[dimethylsilylene(methylcyclopentadienyl)(3-tert-butyl-5-methyl-2-phenoxy)titanium chloride], μ-oxobis[dimethylsilylene(tetramethylcyclopentadienyl)(2-phenoxy)titanium chloride], μ-oxobis[dimethylsilylene(tetramethylcyclopentadienyl)(3-tert-butyl-5-methyl-2-phenoxy)titanium chloride], and the like. Further, compounds obtained by changing chloride in these compounds into fluoride, bromide, iodide, methyl, ethyl, isopropyl, phenyl, benzyl, methoxide, ethoxide, n-propoxide, isopropoxide, phenoxide or pentafluorophenoxide, and the like, are exemplified.

Further, the organoaluminum compound (component (C)) includes trialkylaluminums such as trimethylaluminum, triethylaluminum, tri-n-propylaluminum, tri-n-butylaluminum, triisobutylaluminum, tri-n-hexylaluminum, tri-n-octylaluminum and the like; dialkylaluminum chlorides such as dimethylaluminum chloride, diethylaluminum chloride, di-n-propylaluminum chloride, di-n-butylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, n-butylaluminum dichloride, isobutylaluminum dichloride, n-hexylaluminum dichloride and the like; dialkyl aluminum hydrides such as dimethyl aluminum hydride, diethyl aluminum hydride, di-n-propyl aluminum hydride, di-n-butyl aluminum hydride, diisobutyl aluminum hydride, di-n-hexyl aluminum hydride and the like; alkyl (dialkoxy)aluminums such as methyl(dimethoxy)aluminum, methyl(diethoxy)aluminum, methyl(di-tert-butoxy)aluminum and the like; dialkyl(alkoxy)aluminums such as dimethyl(methoxy)aluminum, dimethyl(ethoxy)aluminum, dimethyl(tert-butoxy)aluminum and the like; alkyl(diaryloxy)aluminums such as methyl(diphenoxy)aluminum, methylbis(2,6-diisopropylphenoxy)aluminum, methylbis(2,6-diphenylphenoxy)aluminum and the like; and dialkyl(aryloxy)aluminums such as dimethyl(phenoxy)aluminum, dimethyl(2,6-diisopropylphenoxy)aluminum, dimethyl(2,6-diphenylphenoxy)aluminum and the like, etc. Of them, preferable are trialkylaluminums, further preferable are trimethylaluminum, triethylaluminum, tri-n-butylaluminum, triisobutylaluminum, tri-n-hexylaluminum and tri-n-octylaluminum, and particularly preferable are triisobutylaluminum and tri-n-octylaluminum.

These organoaluminum compounds may be used singly or in combination of two or more.

The use amount of the component (A) is preferably 1 to 10000 μmol/g, more preferably 10 to 1000 μmol/g and further preferably 20 to 500 μmol/g, per g of the component (B).

The use amount of the component (C) is preferably 0.1 to 1000, more preferably 0.5 to 500 and further preferably 1 to 100, in terms of the mole number of aluminum atoms of the component (C) per mol number of the component (A).

In preparation of a catalyst for polymerization, an electron donative compound (component (D)) may be brought into contact, in addition to the component (A), component (B) and component (C). The use amount of the electron donative compound is preferably 0.01 to 100, more preferably 0.1 to 50 and further preferably 0.25 to 5, in terms of the mole number of the electron donative compound per mol number of the component (A).

The electron donative compound includes triethylamine and tri-n-octylamine.

Contact of the component (A), component (B) and component (C), and if necessary, the electron donative compound, is preferably carried out under an inert gas atmosphere. The contact temperature is usually −100 to 300° C., preferably −80 to 200° C. The contact time is usually 1 minute to 200 hours, preferably 30 minutes to 100 hours. It may also be permissible that components are separately charged into polymerization reaction baths, and the components are brought into contact mutually in a polymerization reaction vessel.

The prepolymerized catalyst for olefin polymerization according to the present invention can be obtained by polymerizing (prepolymerizing) a small amount of olefin using the above-described catalyst component for olefin polymerization, and if necessary, an electron donative compound, then, removing fine particles from the resultant prepolymerized catalyst particles. In the present specification, the fine particles are particles having a particle size of not more than $R^2$ described above present in the prepolymerized catalyst for olefin polymerization.

The olefin used in prepolymerization includes ethylene, propylene, 1-butene, 1-pentene, 1-hexene, 1-octane, 4-methyl-1-pentene, cyclopentane, cyclohexene and the like. These can be used singly or in combination of two or more. Preferably, ethylene is singly used or ethylene and α-olefin are used together, further preferably, ethylene is singly used or ethylene and at least one α-olefin selected from 1-butene, 1-hexene and 1-octane are used together.

The content of the prepolymerized polymer in the prepolymerized catalyst for olefin polymerization is preferably 0.01 to 1000 g, more preferably 0.05 to 500 g and further preferably 0.1 to 200 g, usually per gram of a co-catalyst component.

The method of prepolymerizing a catalyst component for olefin polymerization may be continuous or batch-wise, and examples thereof include a batch-wise slurry polymerization method, continuous slurry polymerization method and continuous gas phase polymerization method. As the method of charging a catalyst component into a polymerization reaction bath for carrying out prepolymerization, a method of changing under anhydrous state using an inert gas such as nitrogen, argon and the like, and hydrogen, ethylene and the like, and a method in which components are dissolved in or diluted with a solvent and charged in the form of solution or slurry, are usually used.

In the case of conducting prepolymerization by a slurry polymerization method, saturated aliphatic hydrocarbon compounds are usually used as the solvent, and examples thereof include propane, n-butane, isobutane, n-pentane, isopentane, n-hexane, cyclohexane, heptane and the like. These are used singly or in combination of two or more. As the saturated aliphatic hydrocarbon compound, those having a boiling point at normal pressure of 100° C. or less are preferable, those having a boiling point at normal pressure of 90°

C. or less are more preferable, and propane, n-butane, isobutane, n-pentane, isopentane, n-hexane and cyclohexane are further preferable.

In the case of conducting prepolymerization by a slurry polymerization method, the slurry concentration is usually 0.1 to 600 g, preferably 0.5 to 300 g, in terms of the amount of a catalyst component for olefin polymerization per liter of a solvent. The prepolymerization temperature is usually −20 to 100° C., preferably 0 to 80° C. During prepolymerization, the polymerization temperature may be changed appropriately. The partial pressure of olefins in a gas phase portion during prepolymerization is usually 0.001 to 2 MPa, preferably 0.01 to 1 MPa. The prepolymerization time is usually 2 minutes to 15 hours.

As the method of removing fine particles from prepolymerized catalyst particles, known classification methods can be used, and it may also be permissible that fine particles are removed, under dried condition according to a dry mode removal treatment, from prepolymerized catalyst particles dried after prepolymerization of an olefin. Drying of prepolymerized catalyst particles can be carried out using conventionally known drying apparatuses.

Removal of fine particles is not intended to completely remove fine particles from prepolymerized catalyst particles for olefin polymerization, but intended to lower the content of fine particles in prepolymerized catalyst particles, and intended to regulate the content of fine particles to 5% by weight or less, thereby obtaining a prepolymerized catalyst according to the present invention.

Further, it may also be permissible that prepolymerized catalyst particles for olefin polymerization are passed through porous material for fractionation which allow passage of fine particles, thereby removing fine particles to obtain a prepolymerized catalyst for olefin polymerization. Such a fine powder removal step will be explained further in detail below referring to FIG. 1.

FIG. 1 is an illustration view for explaining one embodiment of the method of producing a prepolymerized catalyst for olefin polymerization according to the present invention. As shown in FIG. 1, a classification apparatus 1 used in this embodiment has a suction port 2 for prepolymerized catalyst particles for olefin polymerization, a fan 3 allowing a gas in the classification apparatus 1 to flow through, a fractionating screen (porous material for fractionation) 4 for fractionating fine particles, a discharge port 5 for discharging fractionated fine particle, and a takeoff port 6 for taking off a prepolymerized catalyst for olefin polymerization from which fine particles have been removed. The fractionating screen 4 is fixed between the suction port 2 and the discharge port 5 in the classification apparatus 1, and the takeoff port 6 is situated at the side of the suction port 2 from the fractionating screen 4. In this embodiment, nitrogen is filled in the classification apparatus 1. The fractionating screen 4 can be a net having a network structure of certain opening size (fine pore) or the like, and is installed so that its network faces the side of suction port 2.

The dried prepolymerized catalyst particles sucked through the suction port 2 circulate in the classification apparatus 1 by nitrogen circulating in the classification apparatus 1 by rotation of the fan 3. Among the prepolymerized catalyst particles reached to the fractionating screen 4 having a network structure of certain opening size (fine pore), prepolymerized catalyst particles passing through the opening of the fractionating screen 4 are discharged out of the classification apparatus 1 through the discharge port 5, and prepolymerized catalyst particles not passing through the opening of the fractionating screen 4 are taken off through the takeoff port 6.

Thus, fine particles are removed from prepolymerized catalyst particles by separating particles passing through the fractionating screen 4 and particles not passing through the fractionating screen 4 by fractionation. That is, by appropriately selecting the opening of the fractionating screen 4 according to the particle size of prepolymerized catalyst particles to be removed, a prepolymerized catalyst for olefin polymerization having desired particle size distribution can be taken off.

When a prepolymerized catalyst for olefin polymerization according to the present invention is produced as described above, fine particles are removed from olefin-prepolymerized catalyst particles, thus, a prepolymerized catalyst having little fine powder content can be produced. Further, according to the above-described method, olefin-prepolymerized catalyst particles for olefin polymerization are classified, thus, a fine powder generated in the prepolymerization stage of the catalyst for olefin polymerization can also be removed, leading to a capability of production of a prepolymerized catalyst for olefin polymerization having little fine powder content.

When catalyst components for olefin polymerization before prepolymerization of an olefin are classified by sieving or a spray method, brittle fracture tends to occur by collision of catalyst components, leading to a problem of generation of new fine powder components, however, according to the above-described method, such a problem does not occur since catalyst particles after prepolymerization of an olefin are classified. Further, also catalyst components not supported on a carrier in preparation of a catalyst component for olefin polymerization can be removed, thus, a prepolymerized catalyst for olefin polymerization having a good property can also be produced.

(Method of Producing Olefin Polymer)

The method of producing an olefin polymer according to the present invention comprises polymerization of an olefin using the above-described prepolymerized catalyst for olefin polymerization according to the present invention.

In the present invention, the polymerization includes not only homopolymerization but also copolymerization, and the polymer includes not only a homopolymers but also a copolymer. The olefin used in olefin polymerization may be the same as or different from the olefin to be used in the above-described prepolymerization, and a plurality of olefins may be used in combination.

In the present invention, the olefin polymerization method includes a gas phase polymerization method, slurry polymerization method, bulk polymerization method and the like. A gas phase polymerization method is preferable, and a continuous gas phase polymerization method is more preferable. The gas phase polymerization reaction apparatus to be used in the polymerization method is usually an apparatus having a fluidized bed type reaction tank, and preferably an apparatus having a fluidized bed type reaction tank having an enlarged part. A stirring blade may also be installed in the reaction tank.

As the method of feeding a prepolymerized catalyst for olefin polymerization and other catalyst components to a polymerization reaction bath, a method of feeding under anhydrous state using an inert gas such as nitrogen, argon and the like, and hydrogen, ethylene and the like, and a method in which components are dissolved in or diluted with a solvent and fed in the form of solution or slurry, are usually used.

In the case of gas phase polymerization of an olefin, the polymerization temperature is usually lower than the temperature at which the olefin polymer is melted, and preferably 0 to 150° C., more preferably 30 to 100° C. In the polymerization reaction tank, an inert gas may be introduced, and hydrogen may be introduced as a molecular weight modifier. Further, an organoaluminum compound and an electron donative compound may also be introduced.

The polymerization pressure may be in the range under which an olefin can exist as a gas phase in a fluidized bed reactor, and it is usually 0.1 to 5.0 MPa, preferably 1.5 to 3.0 MPa. The gas flow rate in a reactor is usually 10 to 100 cm/sec., preferably 20 to 70 cm/sec. The use amount of a co-catalyst component for a prepolymerized catalyst for olefin polymerization used for gas phase polymerization of an olefin is usually 0.00001 to 0.001 g with respect to 1 g of the olefin.

The olefin to be used for polymerization includes olefins having 2 to 20 carbon atoms such as ethylene, propylene, 1-butene, 1-pentene, 1-hexene, 1-heptene, 1-octane, 1-nonene, 1-decene, 1-dodecene, 4-methyl-1-pentene, 4-methyl-1-hexene and the like. These may be used singly or in combination of two or more. Preferable are ethylene, 1-butene, 1-hexene, 4-methyl-1-pentene and 1-octene.

The method of producing an olefin polymer according to the present invention is suitable for copolymerization of ethylene and an α-olefin having 3 to 20 carbon atoms, and the combination of ethylene and an α-olefin includes ethylene/1-butene, ethylene/1-hexene, ethylene/4-methyl-1-pentene, ethylene/1-octene, ethylene/1-butene/1-hexene, ethylene/1-butene/4-methyl-1-pentene, ethylene/1-butene/1-octene, ethylene/1-hexene/1-octene, and the like, preferably ethylene/1-hexene, ethylene/4-methyl-1-pentene, ethylene/1-butene/1-hexene, ethylene/1-butene/1-octene and ethylene/1-hexene/1-octene.

In olefin polymerization, if necessary, other monomers may be introduced into a polymerization reaction tank, and may be copolymerized in the range not deteriorating the effect of the present invention. The other monomers include a diolefin, cyclic olefin, alkenylaromatic hydrocarbon, α,β-unsaturated carboxylic acid and the like.

Specific examples thereof include diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene, 1,3-cyclohexadiene and the like; cyclic olefins such as cyclopentene, cyclohexene, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene and the like; alkenylaromatic hydrocarbons such as alkenylbenzenes such as styrene, 2-phenylpropylene, 2-phenylbutene, 3-phenylpropylene and the like, alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tertiary butylstyrene, p-secondary butylstyrene and the like, bisalkenylbenzenes such as divinylbenzene and the like, alkenylnaphthalenes such as 1-vinylnaphthalene and the like; α,β-unsaturated carboxylic acids such as acrylic acid, methacrylic acid, fumaric acid, maleic anhydride, itaconic acid, itaconic anhydride, bicyclo(2,2,1)-5-heptene-2,3-dicarboxylic acid and the like; salts of α,β-unsaturated carboxylic acids with a metal such as sodium, potassium, lithium, zinc, magnesium, calcium and the like; α,β-unsaturated carboxylic acid alkyl esters such as methyl acrylate, ethyl acrylate, n-propyl acrylate, isopropyl acrylate, t-butyl acrylate, 2-ethylhexyl acrylate, methyl methacrylate, ethyl methacrylate, n-propyl methacrylate, isopropyl methacrylate, n-butyl methacrylate, isobutyl methacrylate and the like; unsaturated dicarboxylic acids such as maleic acid, itaconic acid and the like; vinyl esters such as vinyl acetate, vinyl propionate, vinyl caproate, vinyl caprate, vinyl laurate, vinyl stearate, vinyl trifluoroacetate and the like; unsaturated carboxylic acid glycidyl esters such as glycidyl acrylate, glycidyl methacrylate, itaconic acid monoglycidyl ester and the like, etc.

According to the method of producing an olefin polymer according to the present invention, an olefin can be polymerized stably and continuously without causing problems such as agglomeration of a prepolymerized catalyst for olefin polymerization in a polymerization reactor, blockage of a cyclone, and the like, since an olefin is polymerized using the prepolymerized catalyst for olefin polymerization according to the present invention.

EXAMPLES

Values for items in examples were measured by the following methods.
(1) Density (Unit: Kg/m$^3$)
The density was measured according to a method defined in method A of JIS K 7112-1980. A sample was subjected to annealing described in JIS K 6760-1995.
(2) Melt Flow Rate (MFR, Unit: g/10 min)
The melt flow rate was measured under conditions of a load of 21.18 N and a temperature of 190° C. according to a method defined in JIS K 7210-1995.
(3) Coarse Particle Content
Polymer particles were sieved through a sieve having a sieve opening of 5 mm, and the weight proportion of polymer particles not passed through the sieve was calculated.
(4) Scattering Ratio
The amount of a powder (mainly fine powders/particle) scattered in unit time to a cyclone placed in a line for circulation of an unreacted raw material gas was divided by the amount of a product powder generated in the same period of time, to give the scattering ratio.
(5) Particle Size Distribution of Prepolymerized Catalyst
Particle size distribution was measured by a laser diffraction particle size distribution analyzer manufactured by Sympatec Gmbh (HELOS & RODOD (model number: HELOS/KF-M RODOS/m)) using a lens of 0.5 to 350 μm at a blowout pressure (dispersive pressure) of 1.5 bar.

Example 1

(1) Preparation of Co-Catalyst Component
Into a nitrogen-purged reactor equipped with a stirring machine was charged 24 kg of toluene as a solvent and 2.81 kg of silica (manufactured by Devison Sylopol 948; average particle size=55 μm; pore volume=1.67 ml/g; specific surface area=325 m$^2$/g) which had been heat-treated at 300° C. under nitrogen flow, and the mixture was stirred. Thereafter, the mixture was cooled down to 5° C., then, a mixed solution composed of 0.91 kg of 1,1,1,3,3,3-hexamethyldisilazane and 1.43 kg of toluene was dropped over a period of 32 minutes while maintaining the temperature of the reactor at 5°

C. After completion of dropping, the mixture was stirred at 5° C. for 1 hour and at 95° C. for 3.3 hours. Thereafter, the resultant solid product was washed with 21 kg of toluene six times. Then, 7.1 kg of toluene was added and the mixture was allowed to stand still to obtain a toluene slurry.

To the above-described toluene slurry was added 1.75 kg of a hexane solution of 50 wt % diethylzinc and 1.0 kg of hexane as a solvent, and the mixture was stirred. Thereafter, the mixture was cooled down to 5° C., then, a mixed solution composed of 0.78 kg of trifluorophenol and 1.41 kg of toluene as a solvent was dropped over a period of 61 minutes while maintaining the temperature of the reactor at 5° C. After completion of dropping, the mixture was stirred at 5° C. for 1 hour and at 40° C. for 1 hour. Then, after lowering of the temperature to 22° C., 0.11 kg of water was dropped over a period of 1.5 hours while maintaining the temperature of the reactor at 5° C. After completion of dropping, the mixture was stirred at 22° C. for 1.5 hours, at 40° C. for 2 hours, further, at 80° C. for 2 hours. Stirring was stopped and the supernatant was extracted until the residual amount reached 16 liters, and 11.6 kg of toluene was added and the mixture was stirred. The temperature was raised to 95° C. and the mixture was stirred for 4 hours. The resultant solid product was washed with 20.8 kg of toluene four times and with 24 liters of hexane three times. Then, the product was dried to obtain a co-catalyst component. As a result of element analysis, it was found that Zn=11 wt %, Si=30 wt %, F=5.9 wt % and N=2.3 wt %.

(2) Prepolymerization

Into a previously-nitrogen-purged reactor (inner volume: 210 liters) equipped with a stirring machine was charged 80 liters of butane at normal temperature, then, 89.5 mmol of raceme-ethylenebis(1-indenyl)zirconium diphenoxide was added. Thereafter, the temperature in the reactor was raised up to 50° C., and the mixture was stirred for 2 hours. The temperature in the reactor was lowered down to 30° C., and 0.1 kg of ethylene was added. Next, 701 g of the co-catalyst component obtained in the above-described Example 1(1) was added. Then, 0.1 liter of hydrogen was added under normal temperature and normal pressure. After stabilization of the system, 263 mmol of triisobutylaluminum was added, and prepolymerization thereof was initiated.

After initiation of prepolymerization, an operation was performed at a polymerization temperature in the reactor of 30° C. for 0.5 hours, then, the temperature was raised up to 50° C. over a period of 30 minute, and thereafter, polymerization thereof was carried out at 50° C. During an initial period of 0.5 hours, ethylene was fed at a rate of 0.7 kg/hour and hydrogen was fed at a rate of 0.7 liter/hour under normal temperature and normal pressure, and from 0.5 hours after initiation of prepolymerization, ethylene was fed at a rate of 2.8 kg/hour and hydrogen was fed at a rate of 8.5 liter/hour under normal temperature and normal pressure, and prepolymerization was carried out for a total period of 7 hours. After completion of prepolymerization, the pressure in the reactor was purged to 0.5 MPaG, and a slurried prepolymerized catalyst was transferred to a drier, and dried under nitrogen flow to obtain a prepolymerized catalyst. The amount of prepolymerization of an ethylene polymer in the prepolymerized catalyst was 28.4 g per gram of the co-catalyst component.

As a result of measurement of the particle size distribution, the average particle size of the prepolymerized catalyst was 150 μm and the proportion of particles of not larger than 98 μm was 9.7 wt %.

(3) Fine Powder Removal Step

Into a high performance blow-thru type sieving machine (Hi-BOLTER® manufactured by TOW HITEC Co., Ltd.) equipped with a screen having an opening size of 150 μm was charged the prepolymerized catalyst obtained in the above-described Example 1(2) under a nitrogen atmosphere, and fine powder removal was performed to obtain a prepolymerized catalyst for olefin polymerization.

As a result of measurement of the particle size distribution, the average particle size thereof was 185 μm and the proportion of particles of not larger than 120 μm was 4.2 wt %.

(4) Fluidized Bed Type Gas Phase Polymerization

Using a fluidized bed type continuous gas phase polymerization reaction apparatus (internal diameter: 50 cm), copolymerization of ethylene and 1-hexene was carried out under polymerization conditions of polymerization temperature: 87° C., pressure: 2.0 MPaG, holdup amount: 80 kg, gas composition: ethylene 86.8 mol %, hydrogen 1.1 mol %, 1-hexene 1.1 mol %, nitrogen 10.7 mol %, hexane 0.3 mol %, circulation gas flow rate: 50 cm/sec.

During polymerization, the prepolymerized catalyst for olefin polymerization obtained in the above-described Example 1(3) was fed at a feeding amount of 44 g/hr. During polymerization, triethylamine was fed at a feeding amount of 0.3 mmol/hr and triisobutylaluminum was fed at a feeding amount of 10 mmol/hr to the polymerization reactor, to produce an ethylene-1-hexene copolymer at an average rate of 21.0 kg/h. The scattering ratio was 1.1 wtppm, and an agglomerate was scarcely generated. The resultant ethylene-1-hexene copolymer had a density of 920.2 kg/m$^3$ and a MFR of 0.54 g/10 min.

After completion of the operation for several months, the reactor was opened and the inside thereof was checked, to observe scarce fouling on enlarged parts.

Example 2

(1) Fine Powder Removal Step

A prepolymerized catalyst was obtained in the same manner as in Example 1(1)(2). The amount of prepolymerization of an ethylene polymer in the prepolymerized catalyst was 28.2 g per gram of the catalyst component for olefin polymerization.

As a result of measurement of the particle size distribution, the average particle size of the prepolymerized catalyst was 152 μm and the proportion of particles of not larger than 99 μm was 9.5 wt %.

Into a high performance blow-thru type sieving machine (Hi-BOLTER® manufactured by TOYO HITEC Co., Ltd.) equipped with a screen having an opening size of 132 μm was charged the prepolymerized catalyst obtained in the above-described Example 2(1) under a nitrogen atmosphere, and fine powder removal was performed to obtain a prepolymerized catalyst for olefin polymerization.

As a result of measurement of the particle size distribution, the average particle size thereof was 187 μm and the proportion of particles of not larger than 122 μm was 4.5 wt %.

(2) Fluidized Bed Type Gas Phase Polymerization

Using a fluidized bed type continuous gas phase polymerization reaction apparatus (internal diameter: 50 cm), copolymerization of ethylene and 1-hexene was carried out under polymerization conditions of polymerization temperature: 87° C., pressure: 2.0 MPaG, holdup amount: 80 kg, gas composition: ethylene 85.5 mol %, hydrogen 1.0 mol %, 1-hexene 1.0 mol %, nitrogen 12.2 mol %, hexane 0.3 mol %, circulation gas flow rate: 50 cm/sec.

During polymerization, the prepolymerized catalyst for olefin polymerization obtained in the above-described Example 2(1) was fed at a feeding amount of 46 g/hr. During polymerization, triethylamine was fed at a feeding amount of 0.3 mmol/hr and triisobutylaluminum was fed at a feeding amount of 10 mmol/hr to the polymerization reactor, to produce an ethylene-1-hexene copolymer at an average rate of 22.0 kg/h. The scattering ratio was 2.7 wtppm, and an agglomerate was scarcely generated. The resultant ethylene-1-hexene copolymer had a density of 921.0 kg/m$^3$ and a MFR of 0.5 g/10 min.

After completion of the operation for several months, the reactor was opened and the inside thereof was checked, to observe scarce fouling on enlarged parts.

Example 3

(1) Fine Powder Removal Step

A prepolymerized catalyst was obtained in the same manner as in Example 1(1)(2). The amount of prepolymerization of an ethylene polymer in the prepolymerized catalyst was 28.3 g per gram of the catalyst component for olefin polymerization.

Into a high performance blow-thru type sieving machine (Hi-BOLTER® manufactured by TOYO HITEC Co., Ltd.) equipped with a screen having an opening size of 173 μm was charged the prepolymerized catalyst obtained in the above-described Example 3(1) under a nitrogen atmosphere, and fine powder removal was performed to obtain a prepolymerized catalyst for olefin polymerization.

As a result of measurement of the particle size distribution, the average particle size thereof was 202 μm and the proportion of particles of not larger than 131 μm was 3.8 wt %.

(2) Fluidized Bed Type Gas Phase Polymerization

Using a fluidized bed type continuous gas phase polymerization reaction apparatus (internal diameter: 50 cm), copolymerization of ethylene and 1-hexene was carried out under polymerization conditions of polymerization temperature: 87° C., pressure: 2.0 MPaG, holdup amount: 80 kg, gas composition: ethylene 86.5 mol %, hydrogen 0.9 mol %, 1-hexene 0.9 mol %, nitrogen 11.4 mol %, hexane 0.3 mol %, circulation gas flow rate: 50 cm/sec.

During polymerization, the prepolymerized catalyst for olefin polymerization obtained in the above-described Example 2(1) was fed at a feeding amount of 44 g/hr. During polymerization, triethylamine was fed at a feeding amount of 0.3 mmol/hr and triisobutylaluminum was fed at a feeding amount of 10 mmol/hr to the polymerization reactor, to produce an ethylene-1-hexene copolymer at an average rate of 22.0 kg/h. The scattering ratio was 0.9 wtppm, and an agglomerate was scarcely generated. The resultant ethylene-1-hexene copolymer had a density of 920.5 kg/m$^3$ and a MFR of 0.5 g/10 min.

After completion of the operation for several months, the reactor was opened and the inside thereof was checked, to observe scarce fouling on enlarged parts.

Comparative Example 1

(1) Preparation of Prepolymerized Catalyst

A prepolymerized catalyst was obtained in the same manner as in Example 1(1)(2). The amount of prepolymerization of an ethylene polymer in the prepolymerized catalyst was 26.9 g per gram of the co-catalyst component.

As a result of measurement of the particle size distribution, the average particle size was 149 μm and the proportion of particles of not larger than 97 μm was 8.2 wt %.

(2) Fluidized Bed Type Gas Phase Polymerization

Using a fluidized bed type continuous gas phase polymerization reaction apparatus (internal diameter: 50 cm), copolymerization of ethylene and 1-hexene was carried out under polymerization conditions of polymerization temperature: 87° C., pressure; 2.0 MPaG, holdup amount: 80 kg, gas composition: ethylene 86.7 mol %, hydrogen 0.9 mol %, 1-hexene 1.0 mol %, nitrogen 11.1 mol %, hexane 0.3 mol %, circulation gas flow rate: 50 cm/sec.

During polymerization, the prepolymerized catalyst obtained in the above-described Comparative Example 1(1) was fed at a feeding amount of 24 g/hr. During polymerization, triethylamine was fed at a feeding amount of 0.3 mmol/hr and triisobutylaluminum was fed at a feeding amount of 10 mmol/hr to the polymerization reactor, to produce an ethylene-1-hexene copolymer at an average rate of 19.0 kg/h. The scattering ratio was 72 wtppm, an agglomerate was generated, and the coarse particle content was 15 wtppm. The resultant ethylene-1-hexene copolymer had a density of 920.6 kg/m$^3$ and a MFR of 0.45 g/10 min.

After the operation for three weeks, an extracting line for a product powder was blocked, leading to stoppage. The reactor was opened and the inside thereof was checked, to observe significant fouling on enlarged parts.

Example 4

(1) Preparation of Co-Catalyst Component

Into a nitrogen-purged reactor equipped with a stirring machine was charged 24 kg of toluene as a solvent and 2.81 kg of silica (manufactured by Devison Sylopol 948; average particle size=55 μm; pore volume=1.67 ml/g; specific surface area=325 m$^2$/g) which had been heat-treated at 300° C. under nitrogen flow, and the mixture was stirred. Thereafter, the mixture was cooled down to 5° C., then, a mixed solution composed of 0.91 kg of 1,1,1,3,3,3-hexamethyldisilazane and 1.43 kg of toluene was dropped over a period of 32 minutes while maintaining the temperature of the reactor at 5° C. After completion of dropping, the mixture was stirred at 5° C. for 1 hour and at 95° C. for 3.3 hours. Thereafter, the resultant solid product was washed with 21 kg of toluene six times. Then, 7.1 kg of toluene was added and the mixture was allowed to stand still to obtain a toluene slurry.

To the above-described toluene slurry was added 1.75 kg of a hexane solution of 50 wt % diethylzinc and 1.0 kg of hexane as a solvent, and the mixture was stirred. Thereafter, the mixture was cooled down to 5° C., then, a mixed solution composed of 0.78 kg of trifluorophenol and 1.41 kg of toluene as a solvent was dropped over a period of 61 minutes while maintaining the temperature of the reactor at 5° C. After completion of dropping, the mixture was stirred at 5° C. for 1 hour and at 40° C. for 1 hour. Then, after lowering of the temperature to 22° C., 0.11 kg of water was dropped over a period of 1.5 hours while maintaining the temperature of the reactor at 5° C. After completion of dropping, the mixture was stirred at 22° C. for 1.5 hours, at 40° C. for 2, hours, further, at 80° C. for 2 hours. Stirring was stopped and the supernatant was extracted until the residual amount reached 16 liters, and 11.6 kg of toluene was added and the mixture was stirred. The temperature was raised to 95° C. and the mixture was stirred for 4 hours. The resultant solid product was washed with 20.8 kg of toluene four times and with 24 liters of hexane three times. Then, the product was dried to obtain a co-catalyst component. As a result of element analysis, it was found that Zn=11 wt %, Si=30 wt %, F=5.9 wt % and N=2.3 wt %.

(2) Prepolymerization

Into a previously-nitrogen-purged reactor (inner volume: 210 liters) equipped with a stirring machine was charged 80 liters of butane at normal temperature, then, 89.5 mmol of raceme-ethylenebis(1-indenyl)zirconium diphenoxide was added. Thereafter, the temperature in the reactor was raised up to 50° C., and the mixture was stirred for 2 hours. The temperature in the reactor was lowered down to 30° C., and 0.1 kg of ethylene was added. Next, 701 g of the co-catalyst component obtained in the above-described Example 4(1) was added. Then, 0.1 liter of hydrogen was added under normal temperature and normal pressure. After stabilization of the system, 263 mmol of triisobutylaluminum was added, and prepolymerization thereof was initiated.

After initiation of prepolymerization, an operation was performed at a polymerization temperature in the reactor of 30° C. for 0.5 hours, then, the temperature was raised up to 50° C. over a period of 30 minute, and thereafter, polymerization thereof was carried out at 50° C. During an initial period of 0.5 hours, ethylene was fed at a rate of 0.7 kg/hour and hydrogen was fed at a rate of 0.7 liter/hour under normal temperature and normal pressure, and from 0.5 hours after initiation of prepolymerization, ethylene was fed at a rate of 2.8 kg/hour and hydrogen was fed at a rate of 8.5 liter/hour under normal temperature and normal pressure, and prepolymerization was carried out for a total period of 7 hours. After completion of prepolymerization, the pressure in the reactor was purged to 0.5 MPaG, and a slurried prepolymerized catalyst was transferred to a drier, and dried under nitrogen flow to obtain a prepolymerized catalyst. The amount of prepolymerization of an ethylene polymer in the prepolymerized catalyst was 28.4 g per gram of the co-catalyst component.

As a result of measurement of the particle size distribution, the average particle size of the prepolymerized catalyst was 150 μm and the proportion of particles of not larger than 98 μm was 9.7 wt %.

(3) Fine Powder Removal Step

Into a high performance blow-thru type sieving machine (Hi-BOLTER® manufactured by TOXO HITEC Co., Ltd.) equipped with a screen having an opening size of 150 μm was charged the prepolymerized catalyst obtained in the above-described Example 4(2) under a nitrogen atmosphere, and fine powder removal was performed to obtain a prepolymerized catalyst for olefin polymerization.

As a result of measurement of the particle size distribution, the average particle size of the prepolymerized catalyst for olefin polymerization was 185 μm, and the proportion of particles of not larger than 120 μm was 4.2 wt % and the proportion of particles of not larger than 98 μm was 0.6 wt %.

(4) Fluidized Bed Type Gas Phase Polymerization

Using a fluidized bed type continuous gas phase polymerization reaction apparatus (internal diameter: 50 cm), copolymerization of ethylene and 1-hexene was carried out under polymerization conditions of polymerization temperature: 87° C., pressure: 2.0 MPaG, holdup amount: 80 kg, gas composition: ethylene 86.8 mmol %, hydrogen 1.1 mol %, 1-hexene 1.1 mol %, nitrogen 10.7 mol %, hexane 0.3 mol %, circulation gas flow rate: 50 cm/sec.

During polymerization, the prepolymerized catalyst for olefin polymerization obtained in the above-described Example 4(3) was fed at a feeding amount of 44 g/hr. During polymerization, triethylamine was fed at a feeding amount of 0.3 mmol/hr and triisobutylaluminum was fed at a feeding amount of 10 mmol/hr to the polymerization reactor, to produce an ethylene-1-hexene copolymer at an average rate of 21.0 kg/h. The scattering ratio was 1.1 wtppm, and an agglomerate was scarcely generated. The resultant ethylene-1-hexene copolymer had a density of 920.2 kg/m³ and a MFR of 0.54 g/10 min.

After completion of the operation for several months, the reactor was opened and the inside thereof was checked, to observe scarce fouling on enlarged parts.

Example 5

(1) Fine Powder Removal Step

A prepolymerized catalyst was obtained in the same manner as in Example 4(1)(2). The amount of prepolymerization of an ethylene polymer in the prepolymerized catalyst was 28.2 g per gram of the catalyst component for olefin polymerization.

As a result of measurement of the particle size distribution, the average particle size of the prepolymerized catalyst was 152 μm, and the proportion of particles of not larger than 99 μm was 9.5 wt %.

Into a high performance blow-thru type sieving machine (Hi-BOLTER® manufactured by TOYO HITEC Co., Ltd.) equipped with a screen having an opening size of 132 μm was charged the prepolymerized catalyst obtained in the above-described Example 5(1) under a nitrogen atmosphere, and fine powder removal was performed to obtain a prepolymerized catalyst for olefin polymerization.

As a result of measurement of the particle size distribution, the average particle size of the prepolymerized catalyst for olefin polymerization was 187 μm, and the proportion of particles of not larger than 122 μm was 4.5 wt % and the proportion of particles of not larger than 99 μm was 0.7 wt %.

(2) Fluidized Bed Type Gas Phase Polymerization

Using a fluidized bed type continuous gas phase polymerization reaction apparatus (internal diameter: 50 cm), copolymerization of ethylene and 1-hexene was carried out under polymerization conditions of polymerization temperature: 87° C., pressure: 2.0 MPaG, holdup amount: 80 kg, gas composition: ethylene 85.5 mol %, hydrogen 1.0 mol %, 1-hexene 1.0 mol %, nitrogen 12.2 mol %, hexane 0.3 mol %, circulation gas flow rate: 50 cm/sec.

During polymerization, the prepolymerized catalyst for olefin polymerization obtained in the above-described Example 5(1) was fed at a feeding amount of 46 g/hr. During polymerization, triethylamine was fed at a feeding amount of 0.3 mmol/hr and triisobutylaluminum was fed at a feeding amount of 10 mmol/hr to the polymerization reactor, to produce an ethylene-1-hexene copolymer at an average rate of 22.0 kg/h. The scattering ratio was 2.7 wtppm, and an agglomerate was scarcely generated. The resultant ethylene-1-hexene copolymer had a density of 921.0 kg/m³ and a MFR of 0.5 g/10 min.

After completion of the operation for several months, the reactor was opened and the inside thereof was checked, to observe scarce fouling on enlarged parts.

According to the present invention, a prepolymerized catalyst for olefin polymerization having a low fine particle content can be produced, thus, it is applicable suitably to the field of continuous production of an olefin polymer.

The invention claimed is:

1. A method of producing a prepolymerized catalyst for olefin polymerization comprising a fine powder removal step of removing fine particles from olefin-prepolymerized catalyst particles for olefin polymerization.

2. The method according to claim 1, wherein the fine particles are removed by passing the fine particles contained in dried prepolymerized catalyst particles through a porous material for fractionation.

3. The method according to claim 1, wherein the prepolymerized catalyst particles are obtained by prepolymerizing an olefin on a catalyst component for olefin polymerization formed by contacting a co-catalyst component, a metallocene compound and an organoaluminum compound.

4. The method according to claim 1, wherein the fine particles are particles having a particle size of not larger than $R^1$ represented by the following formula (1):

$$R^1 = \text{(average particle size of prepolymerized catalyst particles)} \times 0.65 \quad (1).$$

5. A method of producing an olefin polymer comprising performing polymerization of an olefin using a prepolymerized catalyst for olefin polymerization produced by the method described in claim 1.

* * * * *